United States Patent [19]

Tomlinson

[11] Patent Number: 4,575,709

[45] Date of Patent: Mar. 11, 1986

[54] SIGNAL ENCODING-DECODING APPARATUS

[75] Inventor: Martin Tomlinson, Looe, England

[73] Assignee: General Electric Company, Portsmouth, Va.

[21] Appl. No.: 620,856

[22] PCT Filed: Oct. 31, 1983

[86] PCT No.: PCT/GB83/00278

§ 371 Date: Jun. 13, 1984

§ 102(e) Date: Jun. 13, 1984

[87] PCT Pub. No.: WO84/01874

PCT Pub. Date: May 10, 1984

[51] Int. Cl.[4] ............................................. H04N 7/133
[52] U.S. Cl. .............................. 340/347 DD; 358/13; 358/23
[58] Field of Search ................. 358/13, 138, 162, 135, 358/133; 340/347 DD, 347 AD

[56] References Cited

U.S. PATENT DOCUMENTS 3,277,462 10/1966 Sekimoto ............................. 358/13
3,723,879 3/1973 Kaul et al. ........................... 358/135
4,023,199 5/1977 Netravali et al. ...................... 358/13

FOREIGN PATENT DOCUMENTS 1318775 5/1973 United Kingdom ................. 358/13

Primary Examiner—L. T. Hix
Assistant Examiner—David M. Gray

[57] ABSTRACT

In order to reduce the effect of noise on information signals transmitted over a communications link (such as television signals in a DBS link), encoding-decoding apparatus is provided which treats the signals as a series of samples (S) each composed of a base-level component (BLS) having a limited number of possible values and represented by the whole or part of a coarsely quantized signal (termed a Q symbol), and a difference component (DS) providing a fine measure of the difference between the actual sample level and the value of the base-level component (BLS), this difference component (DS) being represented by a high-resolution signal (termed an A symbol). The Q and A symbols are simultaneously or sequentially impressed on a carrier signal as first and second modulations respectively, the Q-symbol first modulations having a limited number of values while the A-symbol second modulations being analog in nature. The first and second modulations may be of the same or different types though the use of phase modulation for both is preferred. Due to this arrangement the base-level component (BLS) of each sample (S) is generally received error free so that the effect of noise on the received signal is kept to a low level.

26 Claims, 25 Drawing Figures

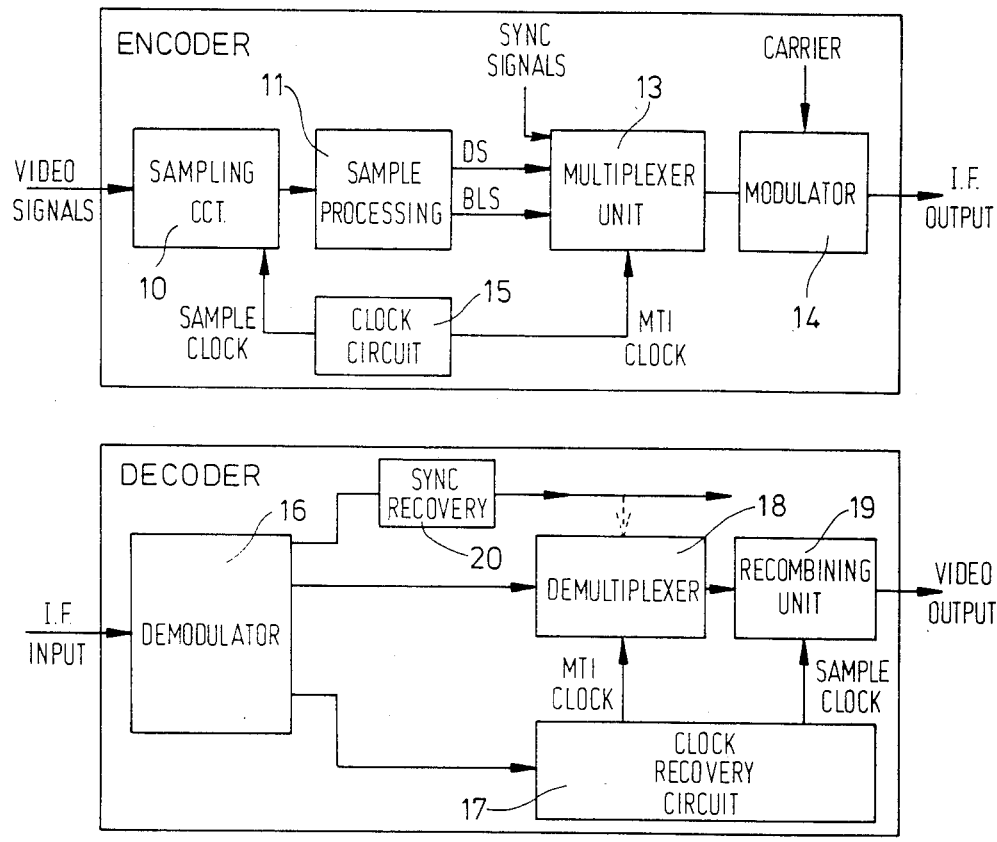
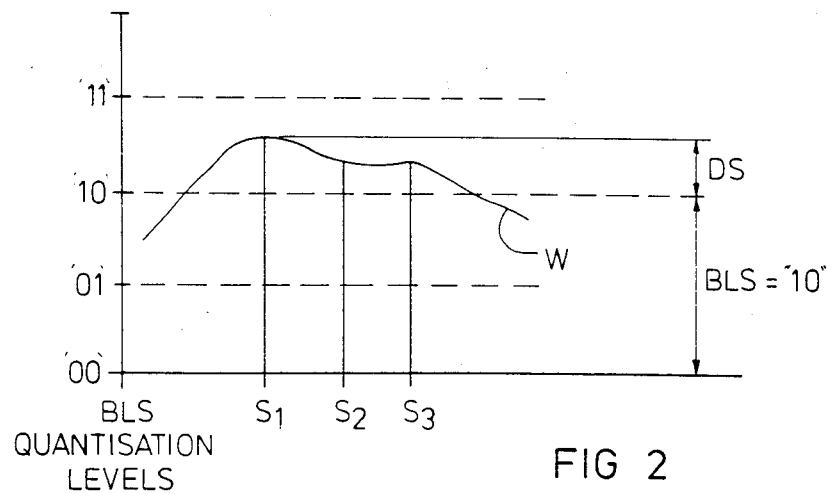
FIG 1
FIG 2

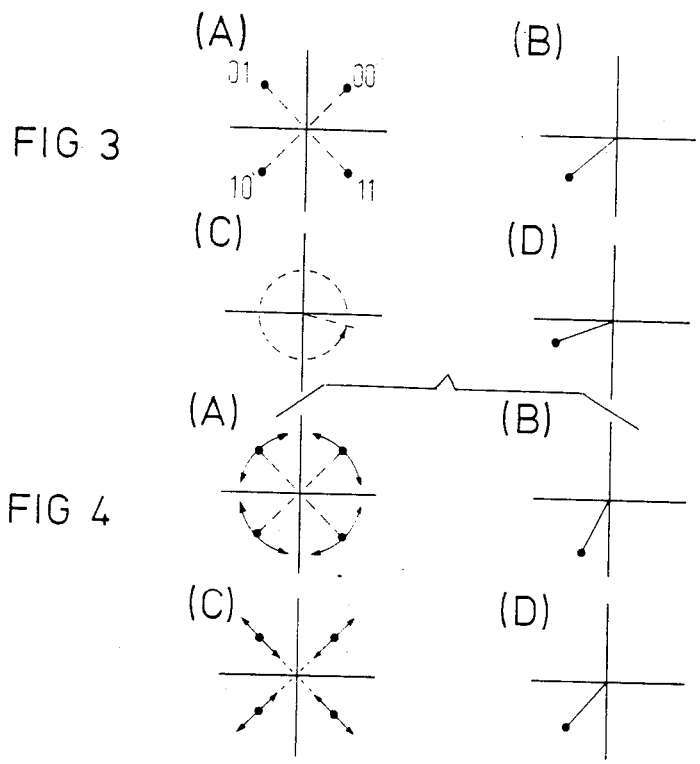
FIG 3
FIG 4
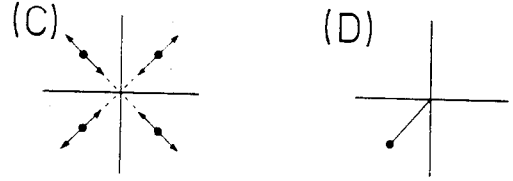
FIG 5
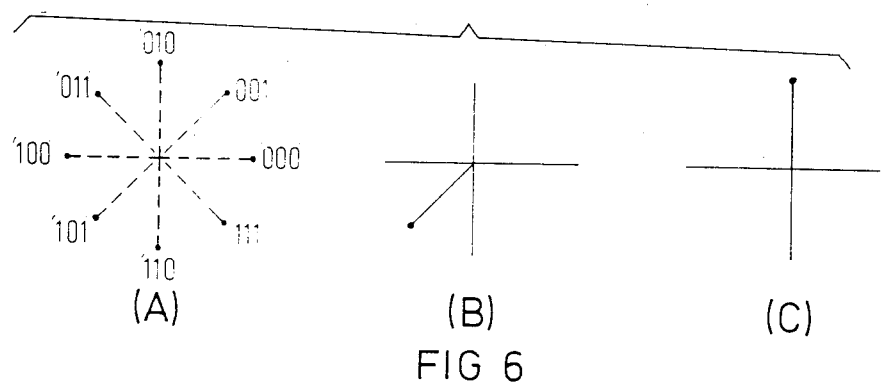
FIG 6

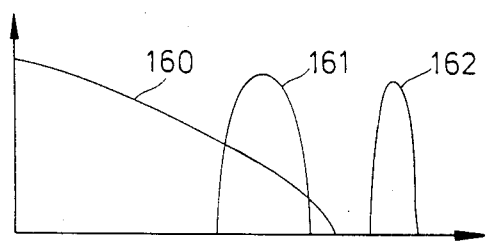
FIG 21
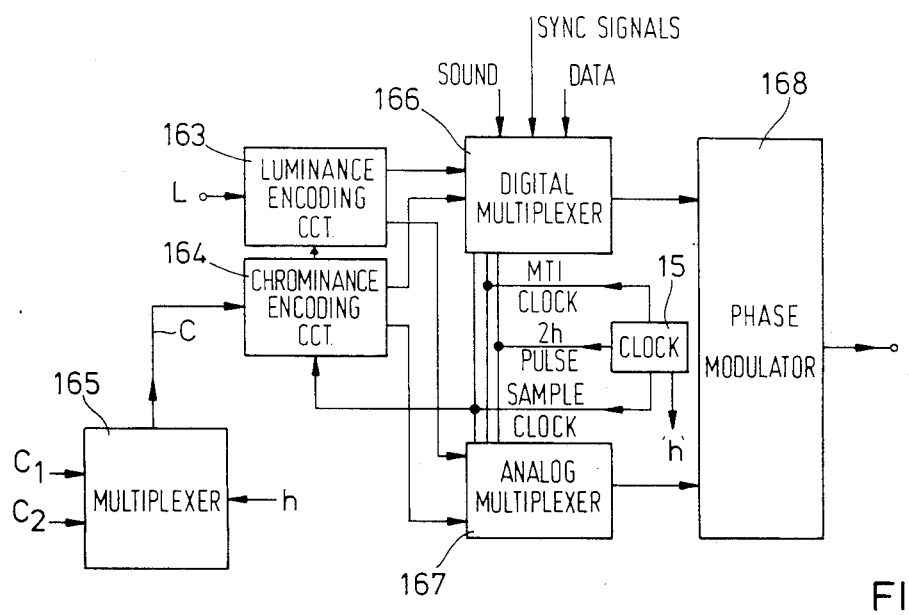
FIG 22
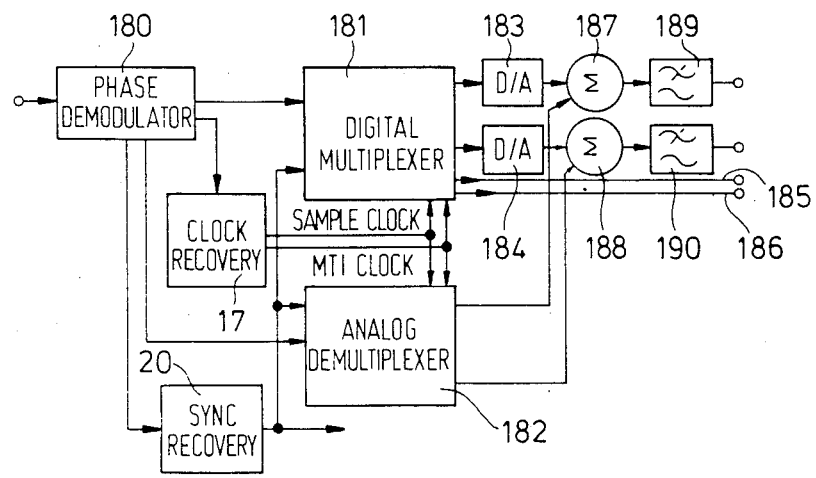

SIGNAL ENCODING-DECODING APPARATUS

The present invention relates to signal encoding-decoding apparatus, provided in a communications system, and comprising an encoder for encoding information signals prior to transmission and a decoder for decoding the received transmissions. In particular, but not exclusively, the invention relates to appartus used to encode and decode colour television signals broadcast via a direct broadcast by satellite (DBS) service.

A characteristic feature of television DBS systems is the very low signal levels involved both due to the power limitations placed on the satellite transporter and due to the relatively small size of the receiving antenna (particularly in domestic situations). As a result, the signal to noise, (SNR) ratio is generally high leading to poor picture quality at the receiver.

It is an object of the present invention to provide apparatus for encoding and decoding television signals, and other information signals in a manner reducing the effect of noise on picture quality.

SUMMARY OF THE INVENTION

Accordingly, in one aspect the present invention, provides encoding-decoding apparatus in which the encoder comprises:

signal processing means (10,11) arranged to sample the information signals sequentially and to represent each sample by the combination of a baselevel signal BLS indicative of a coarse level quantisation of the sample, and a difference signal DS providing a high resolution measurement of the difference between the actual sampled signal level and the quantisation level represented by the BLS signal, encoder signal-organising means arranged to receive and organise said BLS and DS signals into a composite modulation output that is divided into a succession of modulation time intervals MTI and includes, at least when considered over a number of MTI, both coarsely-quantised BLS-related components, hereafter referred to as Q symbols, and high-resolution DS-related components hereafter referred to as A symbols, each symbol being monovalued and occupying one MTI, a carrier signal oscillator for generating a carrier signal, and a modulator responsive to the Q and A symbols of the composite modulation output to modulate said carrier signal respectively with a coarsely quantised first modulation indicative of said BLS signals and with a high resolution second modulation indicative of said DS signals;

and in that the decoder comprises:

a demodulator arranged to receive the modulated carrier signal and to demodulate said first and second modulations to produce a composite demodulated output with Q symbol and A symbol components indicative of the corresponding symbols of the encoder composite modulation output, decoder signal-organising means connected to receive the composite demodulated output and to provide therefrom signals corresponding to the BLS and DS signals of the encoder; and signal recombining means arranged to receive and combine the said signals provided by the decoder signal-organising means to reproduce the information-signal samples in their original sequence.

It can be seen that the encoding-decoding apparatus of the invention combines the advantages of digital and analog transmission by dividing each sample into a coarsely quantised BLS signal and a high resolution DS signal.

The advantage that accrue due to digital transmission are: limited impairment due to noise; the straightforward implementation of time division multiplexing; and the possibility of encryption which may be required for a subscriber type of service. The transmission of an analog component ensures bandwidth efficiency and a demodulated signal to noise ratio that improves as the transmission signal to noise ratio is increased.

Regarding the signal to noise ratio of the apparatus, assuming no transmission errors, the BLS components of the information signals are faithfully reproduced noise free. As for the DS components which produce the fine detail information, although these components are not received noise free, the effects of this noise is limited to low level.

DESCRIPTION OF THE DRAWINGS

Embodiments of the invention will now be described, by way of example, with reference to the accompanying drawings, in which:

FIG. 1 is a generalised block diagram showing the main functional blocks of encoding - decoding apparatus embodying the invention;

FIG. 2 is an amplitude-time diagram for a waveform W showing quantisation levels used to encode samples of the waveform;

FIG. 3 is a modulation diagram illustrating the various possible phase states of a carrier phase-modulated by one form of encoder of the apparatus;

FIG. 4 is a modulation diagram illustrating the various possible phase and amplitude states of a carrier modulated by another form of encoder;

FIG. 5 is a diagram illustrating the organisation of three two-bit sample signals into two three-bit words for controlling modulation of a carrier during two successive time intervals;

FIG. 6 is a modulation diagram showing the phase modulation of a carrier modulated by the apparatus to represent the sample $S_1$ of FIG. 2;

Figure 13:
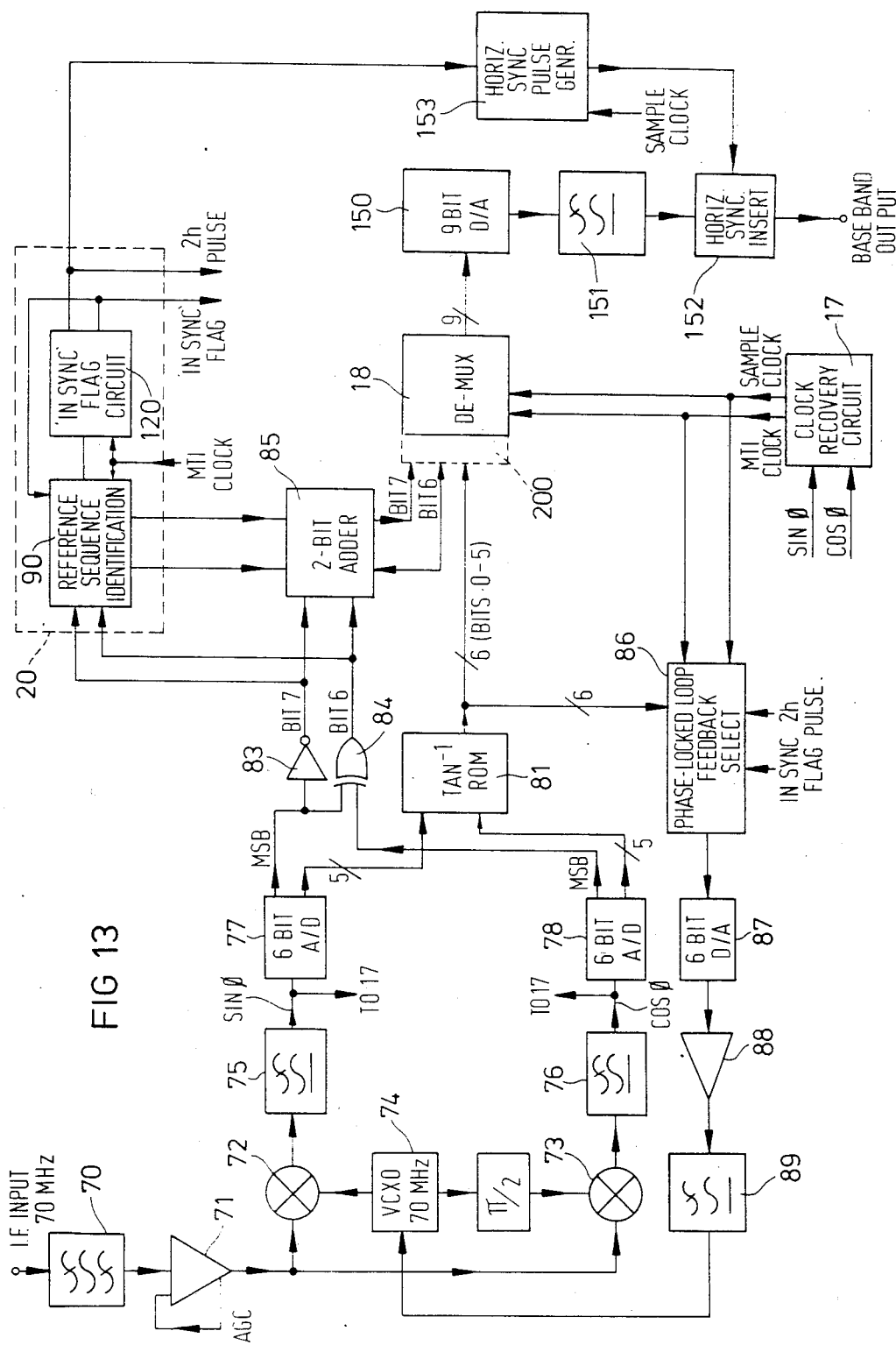
FIG. 13 is a block diagram of a preferred embodiment of a decoder of the apparatus.
Figure 19:
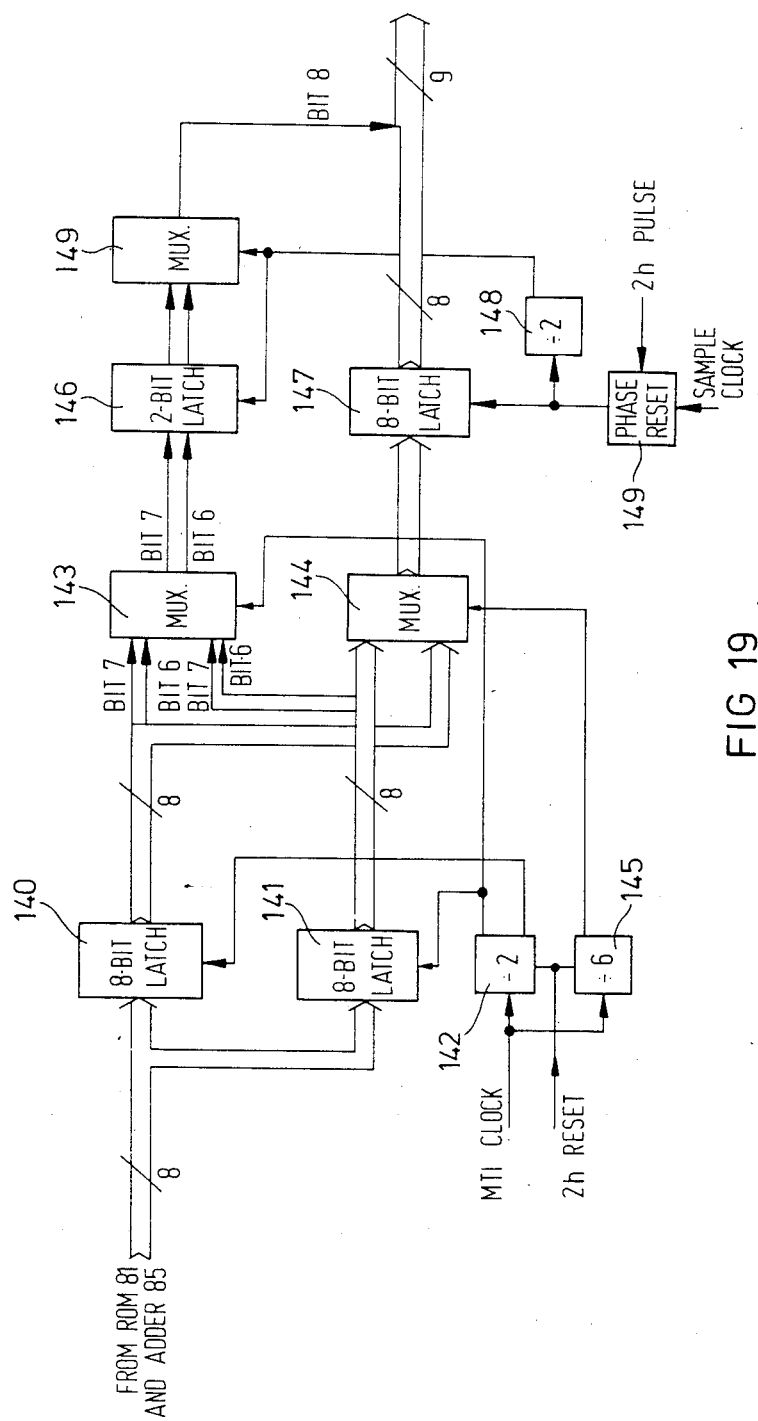
Figure 20:
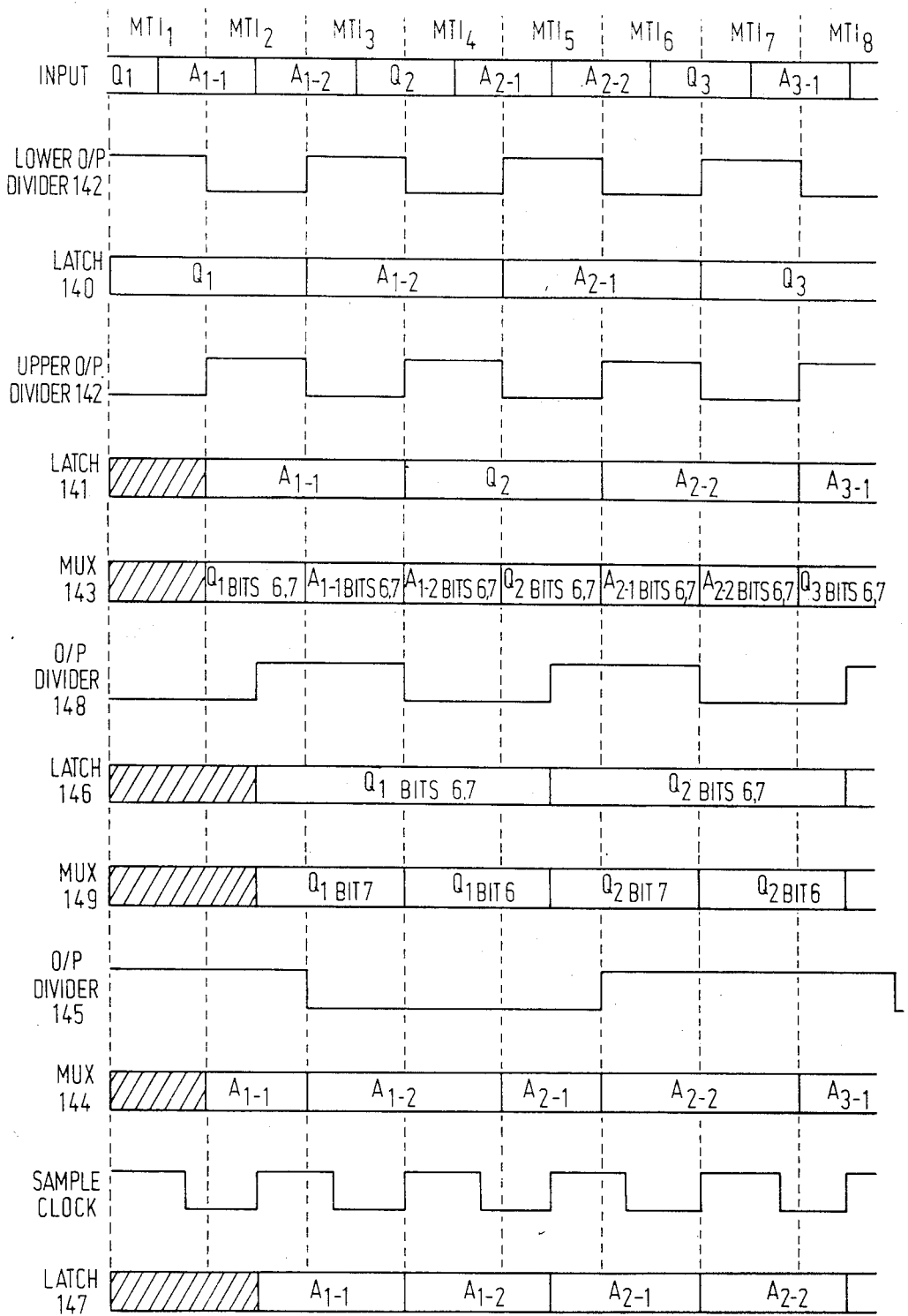
Figure 23:
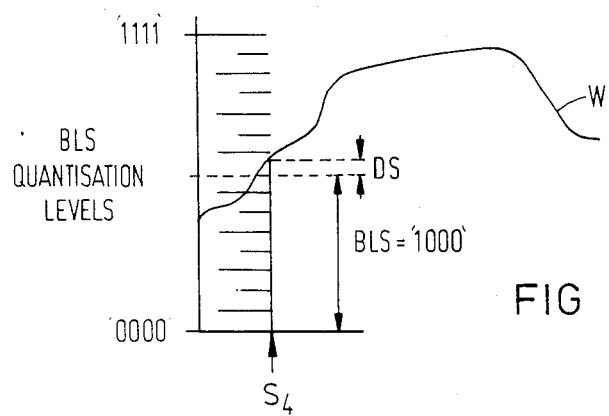
Figure 24:
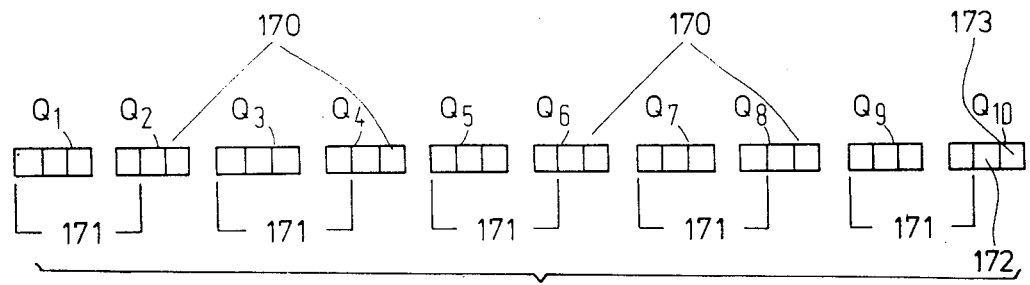
Figure 25:
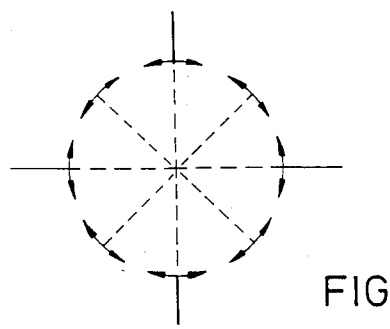

FIG., 18 is a circuit diagram of a phase-locked loop feedback select circuit of the FIG. 13 decoder;

FIG. 19 is a block diagram of a demultiplexer unit of the FIG. 13 decoder;

FIG. 20 is a timing diagram illustrating the operation of the demultiplexer unit;

FIG. 21 is a diagram showing the frequency spectrum of the composite video signal employed in a known television standard;

FIG. 22 is a block diagram of a further form of encoding—decoding apparatus embodying the invention, FIG. 23 is a diagram, similar to FIG. 2, illustrating the encoding process carried out by the FIG. 22 apparatus;

FIG. 24 is a representation of a ten-symbol frame formed in the FIG. 22 apparatus; and FIG. 25 is a modulation diagram illustrating the various possible phase states of a carrier phase-modulated by the FIG. 22 apparatus.

GENERAL PRINCIPLE OF OPERATION

FIG. 1 shows the main functional blocks making up a signal embodying the invention, this encoder being intended to encode colour television signals for broadcast by a DBS service.

The encoder comprises a sampling circuit 10 which samples the television signals to be coded at a frequency of, for example, around 14 MHz, the sampling rate being controlled by a sample clock signal output from a clock circuit 15. The sampling may be effected directly on a composite video waveform or may alternate at intervals between separate luminance, chrominance and sound signals in a manner to be explained more fully hereinafter.

Each signal sample is fed from the sampling circuit 10 to a sample processing stage 11 where it is analysed into a base-level signal (herein abbreviated to BLS) providing a coarse-level quantisation of the sample, and a difference signal (DS) providing a high-resolution measurement of the difference between the actual sampled signal level and the quantisation level represented by the BLS signal. The BLS signal can, for example, be in the form of a coarsely-quantised pulse amplitude modulated (PAM) signal or a digitally encoded signal while the DS signal may be a high resolution PAM signal or high-resolution digitally-encoded signal.

FIG. 2 illustrates the derivation of the signals BLS and DS in the case where four possible quantisation levels exist for the BLS signal, these levels corresponding to binary digital encodings "00", "01", "10", and "11" respectively of the BLS signal; for the sample $S_1$ of the waveform W shown in FIG. 2, the corresponding BLS signal has a binary value "10" indicating that the magnitude of the sample $S_1$ lies between the third and fourth quantisation levels. The DS signal has a value representing the difference between the quantisation level "10" and the actual sample level; this value can be represented, for example, by an eight-bit binary word.

Where both the BLS and DS signals are to be in digitally encoded form, then the sampling circuit 10 and sample processing stage can be jointly constituted by an analog to digital (A/D) converter, the most signficant bit (or bits) of the converter output being used as the BLS signal and the least significant bits as the DS signal. Thus, if as in the FIG. 2 example, the BLS signal is a two-bit binary word and the DS signal is an eight-bit word, the incoming signal would be fed to a ten-bit A/D converter and the two most significant bits used for the BLS signal and the remaining eight bits for the DS signal.

In certain applications, the television signals may in fact be fed to the encoder in digital form in which case these signals could be treated as constituting the BLS and DS signals directly, the most significant bits forming the BLS signals and the remaining bits being used for the DS signals.

The BLS and DS signals representing successive samples are fed from the sample processing stage 11 to a multiplexer unit 13 which organises these signals into a composite modulation output for feeding to a modulator unit 14. This modulation output is divided into a succession of modulation time intervals MTI and is constituted by both coarsely-quantised BLS-related components hereinfater referred to as Q symbols (to indicate their quantised nature) and high-resolution DS-related components, hereinafter referred to as A symbols (to indicate their analog-like nature), each symbol lasting one MTI and being invariant in value during this time. As will become clear below, the Q and A symbols may be output simultaneously or sequentially on the same or separate lines and may each be constituted by a part or the whole of the BLS and DS signal (as appropriate) produced from one or more samples.

The duration of the modulation time intervals (MTI) is controlled by an MTI clock signal fed to the multiplexer unit 13 from the clock circuit 15; the sample clock and MTI clock signals are synchronised with each other but, as will become clear below are not generally of the same frequency.

The modulator unit 14 is controlled by the Q and A symbols of the composite modulation output to modulate a carrier signal respectively with first modulations indicative of the BLS signals and second modulations indicative of the DS signals, the first modulations only having a limited number of possible values (i.e. coarsely quantised) while the second modulations have a wide range of possible values. For convenience, the first modulation will be referred to as a quantised modulation (the coarse nature of this modulation being understood) while the second modulation will be referred to as an analog modulation (even though it may in practice be only finely quantised rather than truely analog). The first and second modulations can take various forms.

Synchronisation information is added into the modulated carrier by multiplexing synchronisation signals into the composite modulation output of the multiplexer unit 13. The modulated output of the modulator unit 14 will generally constitute the output of the I.F. stage of the satellite ground station transmitter.

By way of illustration, several examples will now be given of the organisation of the BLS and DS signals into the Q and A symbols and of the modulations used to impress these symbols onto the carrier. Thus, in one case, the BLS and DS signals of one sample may respectively constitute one Q symbol and one A symbol of the composite modulation output, these symbols being output during respective MTI (modulation time intervals) to control the first and second modulations which may both be phase modulations (these modulations thus being impressed onto the carrier during respective MTI). This arrangement is illustrated in FIG. 3 for the processed sample $S_1$ of FIG. 2. More particularly, for the case depicted in FIG. 2, during a first MTI in which the composite modulation output is constituted by the BLS-related Q symbol, the modulator unit 14 is arranged to modulate the carrier with a quantised first phase modulation that can take on one of four possible values depending on the actual value of the BLS signal (which, as will be recalled may have one of four binary values "00", "01", "10", "11"); these four possible phase modulation values are indicated by the dashed lines in FIG. 3A while the actual value transmitted in the case of the FIG. 2 sample $S_1$ (the "10" value) is illustrated in FIG. 3B. During a second MTI, the DS-related A symbol which constitutes the composite modulation output is transmitted as an analog second phase modulation that can take on any value between 0° and nearly 360°, as is illustrated by the dashed arc in FIG. 3C. The actual modulation value transmitted in the case of the FIG. 2 sample is indicated by the modulation diagram of FIG. 3D.

With the foregoing modulation arrangement, the sample clock rate is half the MTI clock rate since for every sample, two MTI's are required, one for the BLS-representing first modulation and one for the DS-representing second modulation.

Since in the FIG. 3 example both the first and second modulations are phase modulations that may take on identical values during respective MTI, the modulated carrier must be in some way labelled to enable decoding apparatus to know whether the carrier modulation is to be interpreted as a first modulation representing a BLS-related Q symbol or as a second modulation representing a DS-related A symbol. One way of achieving this labelling is to use the synchronisation information to mark a starting point after which the modulations in successive MTI will be of the first or second types in a predetermined sequence. In the case of the FIG. 3 modulation arrangement, a synchronisation sequence may be followed first by a first-modulation MTI, then a second-modulation MTI and thereafter by first and second-modulation MTI in alternation. In fact is is not essential that the BLS-related Q symbols and DS-related A symbols occupy different MTI of the composite modulation output. Thus, FIG. 4 illustrates two modulation arrangements in which the BLS and DS signals associated with each sample constitute the Q and A symbols of the composite modulation output during the same MTI so that the first and second modulation are simultaneusly impressed on the carrier (in these cases, the sample clock rate is the same as the MTI clock rate). In particular, FIGS. 4A, 4B relate to an arrangement in which the first modulation indicative of the Q symbol is a quantised phase modulation as before while the second modulation indicative of the A symbol although still an analog phase modulation, is now impressed on the carrier simultaneously with the first modulation and is centred on the actual phase value of the first modulation; in order to avoid ambiguity in the modulated carrier, the second modulation has a range less than that between adjacent values of the first modulation. FIG. 4A illustrates all possible modulation phase values in the case of a four-level first modulation and FIG. 4B gives the modulation diagram appropriate for the FIG. 2 example. It will be appreciated that with this arrangement, the problem does not arise of identifying whether the modulation is to be interpreted as a first or second modulation as was the case in the FIG. 3 example.

FIGS. 4C and 4D illustrate the case where the first and second modulations that respectively represent the BLS-related Q symbols and DS-related A symbols are of different modulation types. Thus, while the first modulation again takes the form of a four-level phase modulation, the second modulation is now an analog amplitude modulation impressed on the carrier simultaneously with the first modulation. FIG. 4C illustrates all possible amplitude and phase values while FIG. 4D gives the modulation diagram appropriate for the FIG. 2 example.

As already indicated, it is possible to arrange for the multiplexer unit 13 to form each Q symbol from the BLS signal of more than one sample. This can be most readily appreciated by reference to FIG. 5 which shows the binary values of three successive BLS signals derived from the samples $S_1$, $S_2$ and $S_3$ of FIG. 2 (for simplicity, all three BLS signals $BLS_1$, $BLS_2$ and $BLS_3$ are shown with the same binary value "10"). By organising these three two-bit signals into two three-bit words each arranged to constitute a Q symbol during two successive MTI, it can be seen that the information contained therein can be transmitted during two MTI (rather than three) provided that an eight-level modulation of the carrier is acceptable. FIG. 6A illustrates an eight-level phase modulation with the corresponding binary word value of each level. FIGS. 6B and 6C shows the modulation diagrams corresponding to the two three-bit Q symbols formed by the three BLS signals of FIG. 5. Using this modulation arrangement and with the DS signal of each sample being represented by a respective A symbol, the data on three samples is transmitted in five MTI (two MTI for the two BLS-related Q symbols, and three MTI for the three DS-related A symbols); in this case, the sample clock rate is three fifths of the MTI clock rate. As with the FIG. 3 example, the synchronisation information multiplexed in with the BLS and DS signals can be used for identifying whether the modulation is to be interpreted as a first or second modulation.

The decoding of the signal received at a satellite ground terminal is effected on the I.F. input and is basically a reversal of the encoding process with the first and second modulations being detected to form a composite demodulation output with both Q symbol and A symbol components indicative of the corresponding symbols of the composite modulation output in the encoder. The demodulated output is then demultiplexed to reconstitute and recombine the BLS and DS signals so as to reproduce the original signal samples. The main functional blocks of the decoder are shown in FIG. 1 and comprise a demodulator unit 16, a demultiplexer unit 18, a recombining unit 19, and a clock recovery circuit 17 for recovering timing information from the incoming signal and appropriately providing clock signals at the transmitter sample clock rate and MTI clock rate for respectively controlling the operation of the units 15 and 16. A sync recovery circuit 20 is also provided for recovery of synchronisation information multiplexed into the transmitted signal.

The number of quantisation levels for the first modulation is chosen such as to minimise the risk of noise (however caused) from producing an erroneous detection at the receiver of the transmitted quantisation level. In this manner, although the DS signal part of a reconstituted video signal sample may contain noise error, the basic signal level as determined by the BLS signal will have been transmitted noise free. In this way the signal to noise ratio (SNR) of the reconstituted signal is much greater than the SNR existing on the DBS link.

DESCRIPTION OF THE PREFERRED EMBODIMENT

Figure 7:
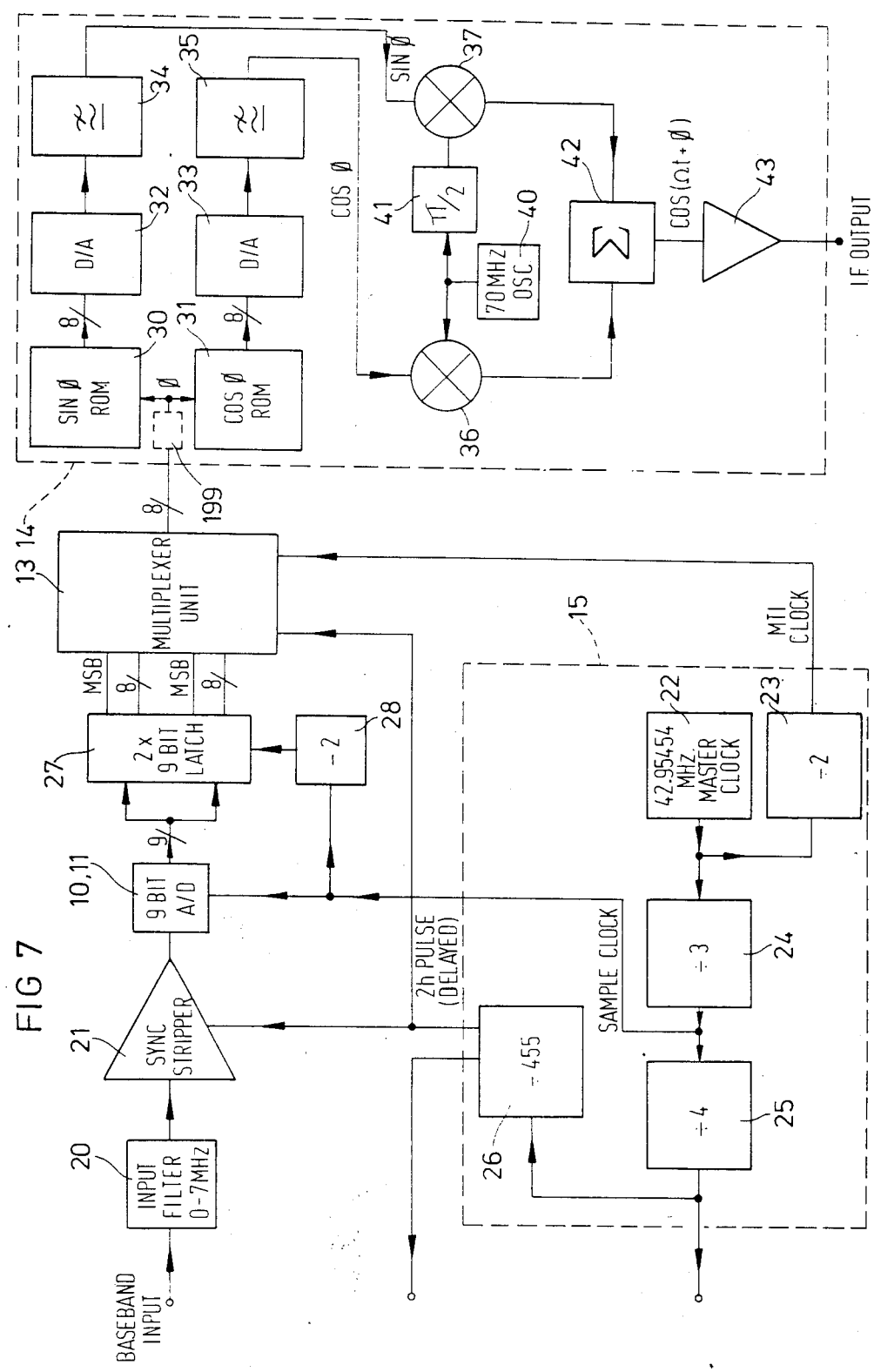
FIG. 7 is a block diagram of a preferred embodiment of the encoder of the apparatus.

FIGS. 7 and 13 respectively show block diagrams of an encoder and decoder of apparatus embodying the invention.

Figure 8:
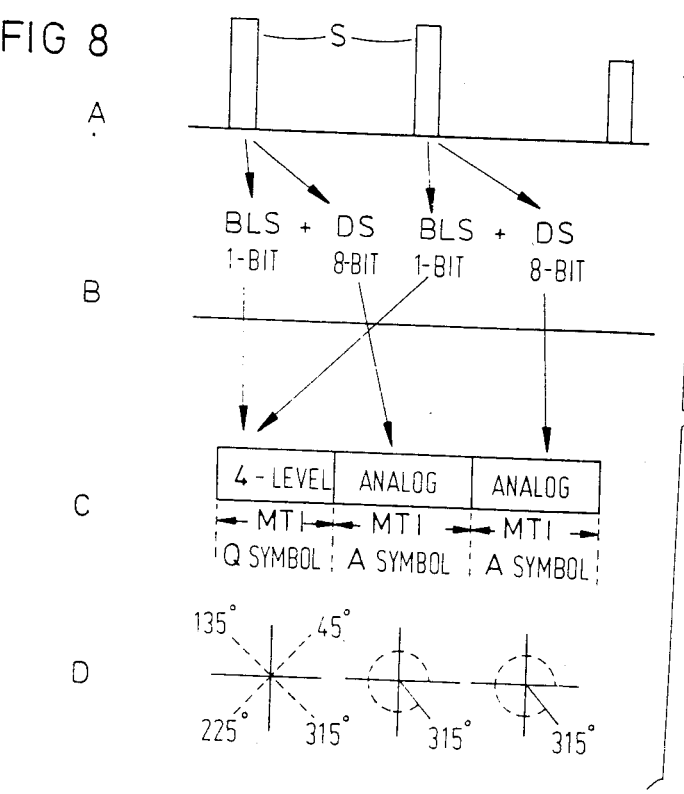
FIG. 8 is a diagram illustrating the sample-encoding process effected by the FIG. 7 encoder lines A to C showing the conversion of a stream of sample signals into a sequence of symbols for transmission during respective modulation intervals, and lines C and D showing the conversion of the symbols into phase modulations of a carrier.

Briefly, in the encoding process implemented by the FIGS. 7, 13 apparatus, each signal sample S (see line A, FIG. 8) is formed into a one-bit BLS signal (i.e., a two level quantisation, these levels being zero and half the maximum signal magnitude) and an eight-bit binary DS signals (see line B, FIG. 8). Each BLS signal is combined with another BLS signal to form a Q symbol which is modulated onto a carrier during a corresponding MTI (line C, FIG. 8) using a four-level first phase modulation, these four levels corresponding to phase modulation of 45°, 135°, 225°, and 315°, respectively (line D, FIG. 8). Each DS signal constitutes by itself an A symbol which is modulated onto the carrier during a respective MTI using an analog second phase modulation having a range of possible values between 0° and 315°. Every two signal samples are thus transmitted using three MTI and, accordingly, the sample clock rate is two thirds that of the MTI clock rate.

The Encoder

Referring now to FIG. 7, the clock circuit 15 of the encoder comprises a master clock 22 of frequency 42.95454 MHz, a divide-by-two circuit 23 connected to divide down the master clock output to a frequency of 21.47727 MHz to be used as the MTI clock, a divide-by-three circuit 24 connected to divide down the master clock output to a frequency of 14.31818 MHz to provide the sample clock, and a divide-by-four circuit 25 and a divide-by-455 circuit 26 connected in series with the output of the circuit 24 and arranged to produce "2h" pulses at half the television line frequency ("h" equals the line period). The divide-by-455 circuit 26 in fact produces both a delayed 2h pulse output for use in the encoder and a normal 2h pulse output which is fed back to the television-signal producing circuitry (not shown) to which is also fed the output of the divide-by-four circuit 25. The purpose of delaying the 2h pulse used in the encoder is to compensate for any dealy experienced by the t.v. signals to be encoded before these signals are received by the apparatus. For ease of description, the delayed 2h pulses used in the encoder will simply be referred to as 2h pulses.

A baseband NTSC composite colour video signal to be encoded is first fed to a low pass input filter 20 having a cut off frequency of 7 MHz. The output of this filter 20 is supplied to a clamping and sync stripper circuit 21 which is also fed with the 2h pulses from the clock circuit 15. The operation of the sync stripper circuit 21 in removing the video sync pulses is standard and therefore will not be described herein, it being simply noted that the removal of the video sync pulses is done in order to reduce the required dynamic range of the apparatus. The output of the circuit 21 is fed to a 9-bit analog/digital converter constituting the sampling circuit 10 and sample processing stage 11 of the FIG. 1 diagram. The converter 10, 11 is clocked by the sample clock output of the clock circuit 15. The most significant bit (MSB) of the 9-bit converter output constitutes the BLS signal while the eight least significant bits (LSB) constitute the DS signal. As already mentioned, the BLS signals from two samples are combined to form one Q symbol. To facilitate this combination, each successive output from the converter 10, 11 is held in a 9-bit latch for two sample periods, these latches being referenced 27 and being clocked by the sample clock output of the clock circuit 15 after this output has been passed through a divide-by-two circuit 28.

The output of both 9-bit latches 27 are fed to a multiplexer unit 13 clocked by the MTI clock output of the clock circuit 15. The multiplexer unit, which will be described in more detail hereinafter, provides a composite modulation output for controlling the modulator 14, this output being constituted by a succession of 8-bit symbol-representing words produced during successive MTI. For each two signal samples provided by the analog/digital converter 10, 11 the multiplexer unit 13 outputs, during three successive MTI, three 8-bit words one of which constitutes a BLS-related Q symbol and can take on only one of four values, while the other two of which constitute DS-related A sumbols and can take on 256 possible values. Each Q and A symbol output from the multiplexer unit 13 represents a desired phase angle $\phi$ by which a carrier is to be phase modulated by the modulator 14, relative to a zero phase reference constituted by the direct output of a 70 MHz crystal oscillator 40 providing the carrier symbol. As can be seen from line D in FIG. 8, the minimum and maximum phase modulations required during any MTI are the same, namely 0° and 315°, regardless of whether the symbol to be modulated onto the carrier is an A or Q symbol. The range of binary values "0000 0000" to "1111 1111" of the symbols output from the multiplexer unit 13 can therefore be used to represent values of $\phi$ between 0° and 315° rather than needing to represent the full angle range to 360°.

The possible values of $\phi$ between 0° and 315° when representing an A synmbol are thus determined by the 256 possible values of the symbol between binary 0000 0000 and 1111 1111. The four possible values of $\phi$ (45°, 135°, 270°, 315°) used to represent a Q symbol are produced by the following four values of the symbol:

| | |
|---|---|
| 0010 0100 | 45° |
| 0110 0100 | 135° |
| 1011 0110 | 225° |
| 1111 1111 | 315° |

It will be noted that the two most significant bits (MSB) of each of the above 8-bit encodings effectively contain the four-state BLS signal information of the Q symbol with each of the four possible values of these two bits serving to indicate the angle quadrant (0°–90°, 90°–180°, 180°–270°, 270°–360°) in which the required angle $\phi$ resides, the positioning of this angle within each quadrant is determined by the six least signficant bits (LSB) of each 8-bit encoding, these LSB being added to the two MSB (determined by the BLS signals) during the multiplexing process.

Figure 9:
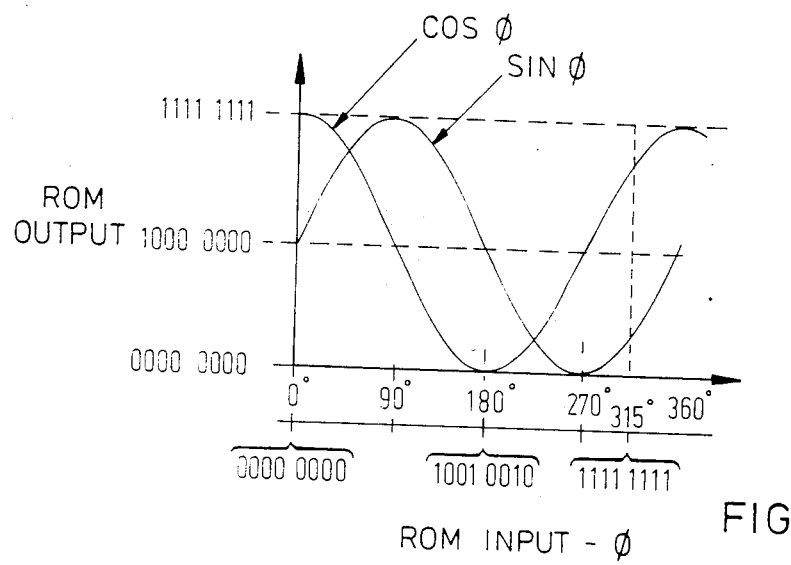
FIG. 9 is a conversion diagram relating the inputs and outputs of sin $\phi$ and cos $\phi$ ROM's of the FIG. 7 encoder.

The 8-bit symbols which are fed to the modulator unit 14 and represent the desired magnitude of phase modulation $\phi$ during each MTI, are supplied to the inputs of two ROM's (read only memories) 30 and 31. The ROM's 30 and 31 are respectively arranged to output 8-bit binary words representing sin $\phi$ and cos $\phi$, the most significant bit of the output of each ROM being, in effect, a sign bit (with binary "1" representing a positive sign). FIG. 9 diagrammatically depicts the conversion process carried out by the ROM's 30, 31 with the input value of $\phi$ (both in binary form and in angle form) being represented along the abscissa and the ROM outputs along the ordinate.

The output of the ROM's 30 and 31 are fed via respective digital/analog converters 32, 33 and filters 34, 35 to respective multipliers 36 and 37. The multiplier 36 as well as being fed with the analog cos $\phi$ signal is also supplied with a carrier signal cos $\omega_c t$ from the 70 MHz oscillator 40 ($\omega_c$ being equal to $2\pi \int 7.10^6 t$). The output of the oscillator 40 is also fed via a $\pi/2$ phase shift circuit 41 to the multiplier 37 for combination with the analog sin $\phi$ signal. The outputs of the multipliers 36 and 37 are respectively cos $\phi$ cos$\omega_c t$ and $-$sin $\phi$ sin$\omega_c t$ and these outputs are summed in a summing circuit 42. It can be mathematically shown that the output of the summing circuit 42 is equal to cos $(\omega_c t + \phi)$. After amplification in an amplifier 43, the output of the summing circuit 42 is passed to the output of the encoder as the transmitter I.F. output.

Figure 10:
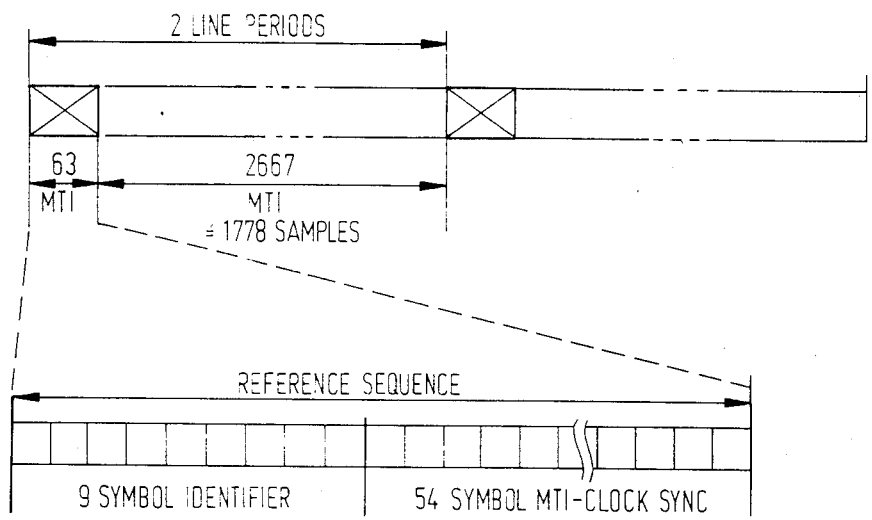
FIG. 10 illustrates the symbol format used during each two-line cycle period of operation of the FIG. 7 encoder, a reference sequence generated at the start of each cycle being shown in expanded form.

The modulated carrier forming the output of the encoder, as well as being modulated in accordance with the Q symbols and A symbols representing the BLS and DS signals from successive t.v. signal samples, is also modulated with synchronisation information; in the present example, this synchronisation information takes the form of a reference sequence of sixty three symbols multiplexed into the output of the multiplexer unit 13 every two line periods, that is every 2730 MTI. FIG. 10A shows this format while FIG. 10B shows the reference sequence in expanded form from which it can be seen that this sequence comprises an initial 9-symbol sequence identification part and a 54-symbol MTI synchronisation part.

During each 127.111 microseconds constituting two line periods 2h,2.933 microseconds are occupied with the reference sequence while the remaining time is used to encode 1778 signal samples.

Figure 11:
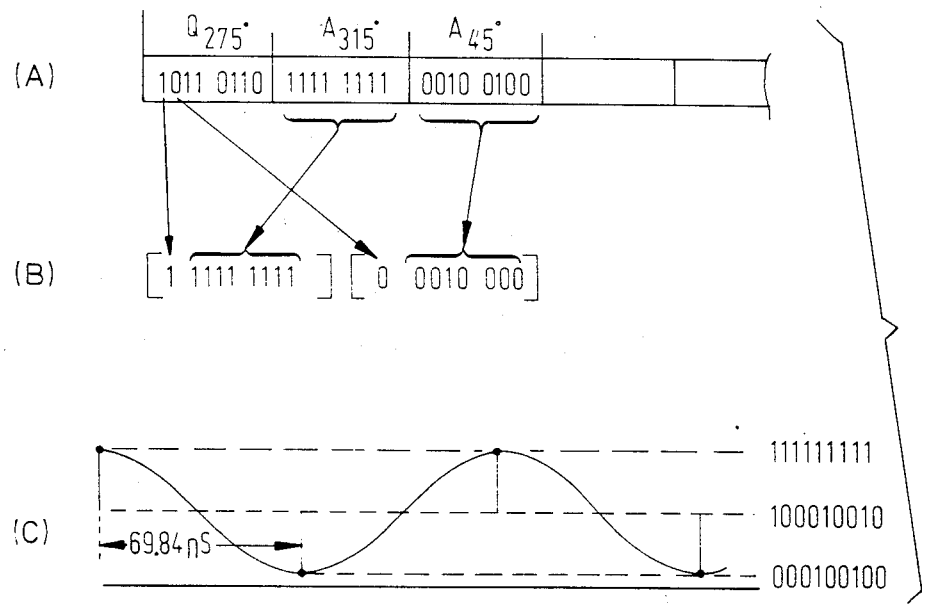
FIG. 11 illustrates the interpretation of an identifier portion of the reference sequence shown in FIG. 10.

The 9-symbol identifier part of the reference sequence must be capable of unambiguously identifying the reference sequence to the decoder and must therefore be constituted by a series of symbols which could not be encountered as a result of the sampling and encoding of the base band input. One way of achieving this is to utilize a series of symbols which if interpreted as representing base band input samples would represent a signal frequency above 7 MHz;l in view of the presence of the input filter 20, clearly such a signal cannot be derived from the base band input. It in fact transpires that by constituting the reference sequence identifier by symbols repeatedly representing the trio of values 225°, 315°, 45° (symbol binary values of 10110110, 11111111, 00100100), then interpretation of these symbols as sample-representing symbol trios made up of one Q symbol and two A symbols would result in the output at the decoder of a large amplitude 7.16 MHz signal. This process is illustrated in FIG. 11 where line A shows the first three symbols of the reference sequence identifier, line B shows how these symbols would be interpreted to sample values if treated as trios of one Q symbol and two A symbols, and line C shows the signal waveform built up from the reconstituted samples (the waveform being centered about the binary value of 100010010 and having a maximum and a minimum of 111111111 and 000100100 respectively).

The MTI-clock synchronisation part of the reference sequence is simply composed of 54 Q symbols alternately representing 45° and 225°. The manner in which this series of symbols is used to achieve MTI-clock synchronisation will become clear during the description of the decoder.

Having described the sequence of symbols required for the present encoding format, a detailed description of the multiplexer unit 13 will now be given with reference to FIG. 12 to show how the required symbol train is formed from the various signals input to the unit 13.

The multiplexer unit 13 comprises three main multiplexers 50, 51 and 52 each with two 8-bit wide inputs and one 8-bit wide output. During the sample encoding portion of each cycle of operation of the multiplexer unit (that is, each two line period), the multiplexers 50, 51 and 52 are respectively arranged to output one Q symbol, a first A symbol, and a second A symbol for each digitally-encoded pair of samples fed to the two 9-bit latches 27. To this end, the eight DS-representing LSB's of the lower 9-bit latch 27 are fed to the upper input of multiplexer 52, the eight DS- representing LSB's of the upper latch 27 are fed to the upper input of the multiplexer 51, and the BLS-representing MSB from each latch 27 is fed to the upper input of the multiplexer 50, these two MSB's constituting the two MSB's of that input. The six LSB's required to be fed to the upper input of the multiplexer 50 in order to give the correct Q symbol encodings for the phase values of 45°, 135°, 225° and 315° are simply derived by the connections shown and an AND gate 57.

As already noted, each two-line cycle period of operation of the multiplexer unit 13 is made up of 2730 MTI divided between an initial 63 MTI for the reference sequence and a final 2667 MTI for the sample symbols. Accordingly, the multiplexers 50, 51 and 52 have their upper inputs connected through to their outputs for all the cycle period except the first 63 MTI thereof. During the first 63 MTI, the lower inputs of the multiplexers 50, 51 and 52 are connected through to the multiplexer outputs, these lower inputs being associated with the signals required for the reference sequence. The switching of the multiplexers 50,51 and 52 is controlled by an MTI counter 53 which is reset by each 2h pulse output from the clock circuit 15 and is arranged to count the MTI clock pulses with the counter output being low until 63 MTI have been counted and then going high until reset. When the output of the counter 53 is low, the lower inputs of the multiplexers 50, 51 and 52 are connected through to the multiplexer outputs while when the counter output is high the upper multiplexer inputs are connected through.

During the sample encoding portion of the cycle period, the Q symbol and two A symbols appearing on the outputs of the multiplexers 50, 51 and 52 are organised into the desired sequence by two further multiplexers 54 and 55, these multiplexers again being of the type having two 8-bit wide inputs and one 8-bit output. The outputs of the multiplexers 51 and 52 producing the A symbols are fed to respective inputs of the multiplexer 54. The switching of this multiplexer is controlled by an output of a divide-by-three circuit 56 fed by the MTI clock, the circuit being so arranged that for every three MTI periods its outputs connected to the multiplexer 54 is high during only the second of these periods. As a result, the A symbol output by the multiplexer 51 is passed through the multiplexer 54 only during the middle one each successive trios of MTI; during the two other MTI of each trio the A symbol output by the multiplexer 52 is passed through the multiplexer 54.

The output of the multiplexer 54 is fed to one input of the multiplexer 55 the other input of which is fed from the output of the multiplexer 50. The switching of the multiplexer 55 is controlled by a second output of the divide-by-three circuit 56, this second output being high during the first MTI of each successive trio of MTI. This second output of the circuit 56 is fed to the multiplexer 55 via an OR gate 64 and controls the multiplexer 55 such that during the first MTI of each successive trio, the Q symbol output by the multiplexer 50 is passed through the multiplexer 55 to the multiplexer unit output, while during the second and third MTI of each trio, the output of the multiplexer 54 is fed through to the multiplexer unit output. In this manner, during the sample-encoding portion of each operating cycle, for each trio of MTI, the Q symbol appearing at the output of the multiplexer 50 is fed to the unit output during the first MTI, the A symbol at the output of the multiplexer 51 is fed to the unit output during the second MTI, while the A symbol at the output of the multiplexer 52 is fed to the unit output during the third MTI.

At the beginning of each cycle period, the circuit 56 is reset by a 2h pulse to ensure that its outputs are so synchronised that the first symbol (and thereafter every third symbol) output by the unit 13 is a Q symbol; this synchronisation together with the presence of the reference sequence identifier, enables the decoding apparatus to know whether to interpret a received symbol as an A or Q symbol.

The structure and function of the multiplexer unit during the reference sequence portion of each cycle of operation of the unit will now be considered. As already mentioned, the reference sequence is headed by a nine symbol identifier and during this period three repetitions are made of the symbol sequence 1011 0110, 1111 1111, 0010 0100 (see FIG. 11). This symbol sequence is readily achieved by feeding the digital encodings 1011 0110, 1111 1111, 0010 0100 to the lower inputs of the multiplexers 50, 512 and 52 respectively, enabling the lower inputs from the counter 53, and operating the multiplexers 54 and 55 as during the sample encoding process. The required digital inputs to the multiplexers 51 and 52 are hardwired connections while the digital encoding 1011 0110 required to be supplied to the multiplexer 50 is derived via a further multiplexer 58 (again of the type having two 8-bit wide inputs and one 8-bit output). As can be seen in FIG. 12, the 1011 0110 encoding required for the sequence identifier is fed to the lower input of the multiplexer 58 which is enabled during the first nine MTI of the cycle sequence in a manner to be described more fully below.

After transmission of the sequence identifier during the first 9 MTI of a cycle period, the remaining 54 MTI of the reference sequence are used for the transmission of alternating-phase symbols, the values of these symbols being 1011 0110 and 0010 0100. This is achieved by feeding to the upper input of the multiplexer 58 the digital encoding 0010 0100 and then alternately enabling the upper and lower inputs of the multiplexer 58, the output of the multiplexer being routed via the multiplexers 50 and 55 to the output of the unit 14. To this end, a high signal is produced during the last 54 MTI of the reference sequence by means of two MTI counters 59 and 61 both of which are reset by a 2h at the beginning of each cycle period. Both counters 59 and 61 are arranged to count the MTI clock pulses with the counter 59 generating a high ouput after 9 MTI following reset and the counter 61 generating a high output after 63 MTI following reset. The outputs from the counters 59 and 63 are fed to an Exclusive OR gate 60 the output of which is therefore high during the 54 MTI starting with the tenth MTI following reset. This 54-MTI-duration enable pulse is fed to one input of an AND gate 62 the other input of which is fed with the output of a divide-by-two circuit 63 supplied with the MTI clock pulses. The output of the gate 62 is thus low except when the enable pulse from the gate 61 is present during which time the output of the gate 62 alternates between high and low states during successive MTI. The output of the gate 62 is used to switch the multiplexer 58 whereby to provide the required phase-alternation digital encodings during the 54 MTI starting with the tenth MTI into the cycle period of the multiplexer unit 14; except during this latter period, the multiplexer 58 has its lower input enabled.

The Decoder

The decoder shown in block diagram form in FIG. 13 forms the I.F. strip of a satellite receiving unit. After filtering in a bandpass filter 70 and amplification in an amplifier 71 with automatic gain control (AGC), the IF input is fed to the demodulator unit of the decoder where the phase of the received carrier is compared with a reference phase established by the output of a voltage controlled crystal oscillator 74 that is governed by a phase locked loop sensitive to a known reference modulation of the receiver carrier. The I.F. input fed to the demodulation unit is passed to two multipliers 72 and 73 to each of which is also fed the 70 MHz output from the oscillator 74, the oscillator output fed to the multiplier 73 being shifted by $\pi/2$ relative to that fed to the multipler 72. The outputs of the multipliers 72 and 73 are passed through respective low pass filters 75 and 76 to remove signal components at twice the carrier frequency $\omega_c$ (70 MHz).

In the present apparatus, when the oscillator 74 is in correct phase lock with the incoming signal so that the above-mentioned reference phase is properly established in the demodulator, the outputs, of the filters 75 and 76 will respectively represent the quantities $\sin \phi$ and $\cos \phi$. These $\sin \phi$ and $\cos \phi$ signals are fed to respective analog/digital converters 77 and 78 which produce 6-bit representations of the signal. The correspondence between the digital outputs of the A/D converters 77 and 78 and the $\sin \phi$ and $\cos \phi$ inputs to these converters is substantially as shown in FIG. 9 for the ROM outputs (except that the converters produce 6-bit rather than 8-bit outputs).

Figure 14:
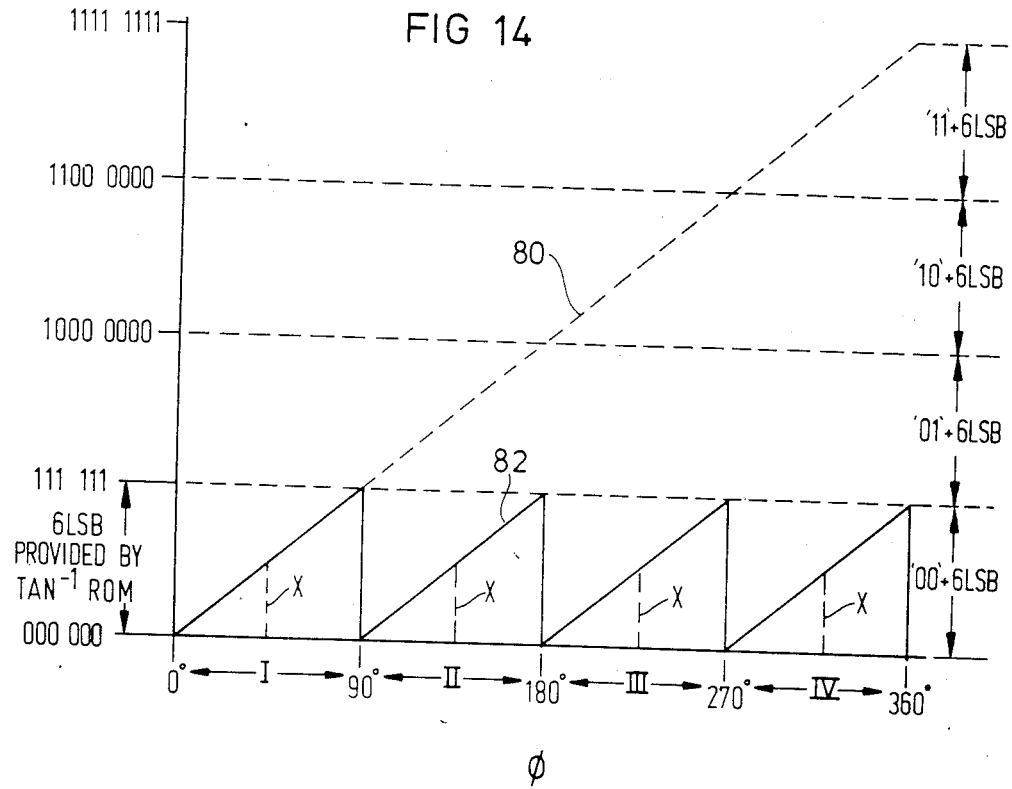
FIG. 14 is a diagram illustrating the reconstruction of each transmitted symbol by the FIG. 13 decoder.

In order to correctly decode the A symbols used to provide an analog-like representation of $\phi$, the 6-bit digital outputs of the converters 77 and 78 are used to produce an 8-bit digital word which linearly increases in value from 0000 0000 to 1111 1111 as $\phi$ varies from 0° to 360° (such a variation being indicated by dashed line 80 in FIG. 14). It should be noted that in the decoder the range of $\phi$ required to be represented extends to 360° and not 315° as in the encoder, this being required for the proper operation of the phase lock loop used to control the oscillator 74 and which will be described in more detail hereinafter.

The 6-bit outputs from the converters 77 and 78 are used in the following manner to implement the required linear relationship 80. As already noted with reference to FIG. 9, the MSB of the $\sin \phi \cos \phi$ digital encodings are, in effect, sign bits with a "1" representing a positive sign. By using the two sign bits associated with the $\sin \phi$ and $\cos \phi$ digital signals output by the converters 77 and 78, it is possible to determine in which angle quadrant I, II, III, or IV (see abscissa in FIG. 14) the angle $\phi$ resides. The precise value of $\phi$ within a quadrant is determined by the LSBs of the digitally encoded sin $\phi$ and cos $\phi$ signals. To this end, the five LSB of the digital signals output by the converter 77 and 78 are fed to a tan$^{-1}$ ROM arranged to output a 6-bit digital signal bearing a linear relationship with the angle $\phi$ within each quadrant. This relationship is depicted by the repeating triangular waveform 82 in FIG. 14; as can be seen, as increases between its minimum and maximum values each quadrant, the digital output of the ROM changes from 000 000 to 111 111.

The relationship illustrated by dashed line 80 in FIG. 14 can now be produced by differently weighting the tan$^{-1}$ ROM output in dependence on which quadrant the angle $\phi$ resides, this weighting being achieved by adding two MSB (bits 6 and 7) to the 6-bit output (bits 0 to 5) of the ROM 81. The required values for the weighting bits 6 and 7 can be derived from the MSB or sign bits of the sin $\phi$ and cos $\phi$ signals output by the converters 77 and 78; the value of these sign bits and the required values of the bits 6 and 7 are given, for each quadrant, in the following Table:

| Quadrant | I | II | III | IV |
|---|---|---|---|---|
| (MSB Sin $\phi$) | 1 | 1 | 0 | 0 |
| (MSB Cos $\phi$) | 1 | 0 | 0 | 1 |
| Bit 6 | 0 | 1 | 0 | 1 |
| Bit 7 | 0 | 0 | 1 | 1 |

From a sturdy of the foregoing Table, it can be seen that bit 7 can be simply produced by inverting the MSB of the sin $\phi$ signal while bit 6 can be produced by performing an exclusive OR function on the MSBs of the sin $\phi$ and cos $\phi$ signals. Thus, in FIG. 13 the MSBs of the output of the converters 77 and 78 are shown as being fed to an inverter 83 to produce bit 7 and to an exclusive OR gate 84 to produce bit 6. Ater passage through a 2-bit adder 85 (the function of which will be described hereinafter), the bits 7 and 6 are fed, together with bits 0 to 5 produced by the ROM 81, as an 8-bit representation of the quantity $\phi$ to the input of a de-multiplexer unit 18.

So far as the four-level Q symbols are concerned, the necessary information content of these signals is contained in the MSBs of the sin $\phi$ and cos $\phi$ signals output from the converters 77 and 78. Indeed, the conversion required to recover each pair of BLS signals from each Q symbol is the same as the conversion effected by the inverter 83 and gate 84 so that the bits output by these latter elements will, in the presence of a Q symbol, correspond to the two 1-bit digital BLS signals originally encoded.

The foregoing description of the demodulation process was given on the assumption that correct phase lock had been achieved between the oscillator 74 and the incoming signal. This phase lock is obtained by means of a phase-locked loop in which a signal proportional to the difference in phase between the output of the oscillator 74 and a reference phase modulation of the incoming carrier is used to control the oscillator frequency; such a loop will only stabilise itself with the oscillator frequency exactly matching that of the incoming carrier and phase shifted relative thereto by an amount sufficient to produce the size of feedback signal necessary to correctly set the oscillator frequency. If the phase of the incoming carrier is varying randomly, it is of course very difficult to get the loop to settle since there is effectively no phase reference against which the oscillator can compare itself. In the present case, while the phase of the carrier changes with every symbol sent, the phase $\phi$ of each Q symbol can only be one of four values, namely 45°, 135°, 225° and 315° relative to the zero phase reference of the encoding apparatus (see line D of FIG. 8). Furthermore, if no regard is had to the quadrant in which $\phi$ exists, then not only will each Q symbol represent the same value of $\phi$ (45° with reference to the zero phase reference of the encoder), but the average of $\phi$ for the A symbols will also be around this value (45°). Thus there exists a predominant and average in-quadrant value of $\phi$ and this value can be used as the required phase reference for the phase locked loop.

Accordingly, in the present apparatus the in-quadrant carrier phase signal constituted by the output of the ROM 81 is fed back to control the oscillator 74 via a feedback path comprising a feedback select circuit 86 (the function of which will become apparent hereinafter) a six-bit digital/analog converter 87, an amplifier 88, and a filter 89 which produces the required averaging of the feedback signal.

The design of the overall phase locked loop (elements 72 to 78, 81, and 86 to 89) is such that the actual phase difference required between the output of the oscillator 74 and the average in-quadrant phase of the incoming carrier in order to match the oscillator frequency with that of the carrier, is equal to the value of the carrier phase $\phi$ relative to the phase zero of the encoding apparatus. As a result, the phase of the oscillator when in lock effectively establishes the encoding apparatus phase zero in the decoder thereby enabling the signals produced at the output of the filters 75 and 76 to be correct representations of sin $\phi$ and cos $\phi$ without any in-quadrant angle offset. Since the average phase of the incoming carrier is $\phi = 45°$, the average value feedback from the ROM 81 when phase lock is established will be between 011 111 and 100 000.

It will be appreciated that the apparatus could have been designed to achieve phase lock with an actual phase difference between the oscillator output and the predominant phase of the incoming carrier different from the value of the predominant carrier phase modulation considered relative to the carrier phase produced by zero modulation of the carrier. In this case, the signals output from the filters 75, 76 would not represent sin $\phi$ and cos $\phi$ directly but rather, sin ($\phi + \theta$) and cos ($\phi + \theta$), the angle ($\phi + \theta$) being the phase angle between the output of the oscillator 74 and the received carrier where $\theta$ (which can be positive or negative) is the phase offset between the oscillator phase when in lock and the phase of the received carrier with zero phase modulation. Correction for the offset $\theta$ can be introduced by appropriately programming the tan $^{-1}$ ROM 81 such that its output is the in-quadrant value of $\phi$ (rather than $\phi + \theta$) or by subtracting from the output of the ROM 81 a value corresponding to $\theta$. Of course, in the present example $\theta = 0$ so that there is no need to apply any corrective offset.

Once the phase locked loop has locked up and the encoder has synchronised itself with the incoming signal, it is possible to identify which signals are Q symbols and which are A symbols. Since the A symbols have in-quadrant values of $\phi$ which are generally not equal to the reference φ of 45° (but only average out approximately to this value), it is desirable to prevent these values from being fed back and this is therefore done when the synchronisation necessary to permit A symbol identification has been achieved. The deletion of the A symbols from the feedback information is effected by the feedback select circuit 86 which will be described later.

By using only in-quadrant phase data to achieve phase lock, it is, of course, possible for the oscillator 74 to lock up in any one of the four possible states corresponding to equal to 45° in each of the four quadrants I to IV, there being no difference in the feedback signal between these quadrants. The four possible phase lock states are illustrated by dashed vertical lines X in FIG. 14. Of course, in only one of these states will φ be detected in the correct quadrant; in other words, in only one phasee lock state will the MSB of the sin φ and cos φ signals correctly identify the quadrant in which φ lies.

Rather than endeavouring to obtain phase lock in the correct quadrant, in the present decoder phase lock is allowed to occur in any of the four possible states and the resultant demodulated values of φ fed to the demultiplexer 18 are suitably corrected to take into accout that phase lock may not have occurred in the correct quadrant. The required quadrant correction need, of course, only be applied to bits 6 and 7 fed to the demultiplexer 18 and is effected by means of the 2-bit adder 85.

In order to insert the required correction, it is necessary first to decide in which quadrant phase lock has been achieved and then to output the appropriate correction bits to the adder 85. These functions are performed in the present apparatus by the reference sequence identification circuit 90 which forms part of the synchronisation unit 20 of the decoding apparatus. However, before the operation of the circuit 19 is described, the function of the clock recovery circuit 17 will be explained since an output from this latter circuit is required for the correct operation of the reference sequence identification circuit 90.

Figure 15:
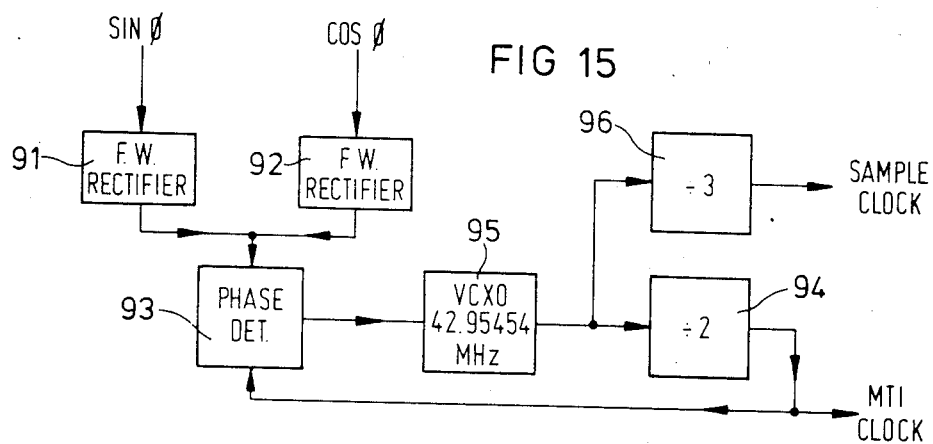
FIG. 15 is a block diagram of a clock recovery circuit of the FIG. 13 decoder.

The clock recovery circuit 17 is shown in block form in FIG. 15 and includes two full wave rectifier units 91 and 92 respectively fed with the analog sin φ and cos φ signals output from the filters 75 and 76. During the sample-encoding portion of the two-line cycle period of the incoming signal, the rectified outputs of the full wave rectifier units 91 and 92 will not present any coherent pattern. However, during the 54 symbol synchronisation portion of the reference sequence (see FIG. 10) of each cycle, the reversal of encoded phase in alternate symbols will produce at the inputs to the units 91 and 92, in-phase signals at a frequency equal to half the MTI clock frequency, the amplitude of these signals being the same when the phase-locked loop including the oscillator 84 is in lock but different when the loop is searching for lock. As a consequence, during the 54-symbol synchronisation portion of the reference sequence, d.c. voltages are produced at outputs of the units 91, 92 that fluctuate in magnitude at the MTI clock frequency (the full wave rectification process causing a frequency doubling effect). The signals at the outputs of the units 91 and 92 are added together and fed to the input of a phase detector 93 for comparison with the decoder MTI clock signal produced via a divide-by-two circuit 94 from a voltage controlled crystal oscillator 95. The output signal from the phase detector is used to control the oscillator 95. The parameters of the phase locked loop constituted by the units 93, 94 and 95 are such that the MTI clock signals of the decoder are phase delayed relative to those of the encoder by an amount sufficient to ensure that the demultiplexer 18 works on a near mid point value of each symbol thereby avoiding any transients which may occur as one symbol, is changed to the next. The sample clock signals of the decoder are produced using a divide-by-three circuit 96 the input of which is connected to the output of the oscillator 95.

Figure 16:
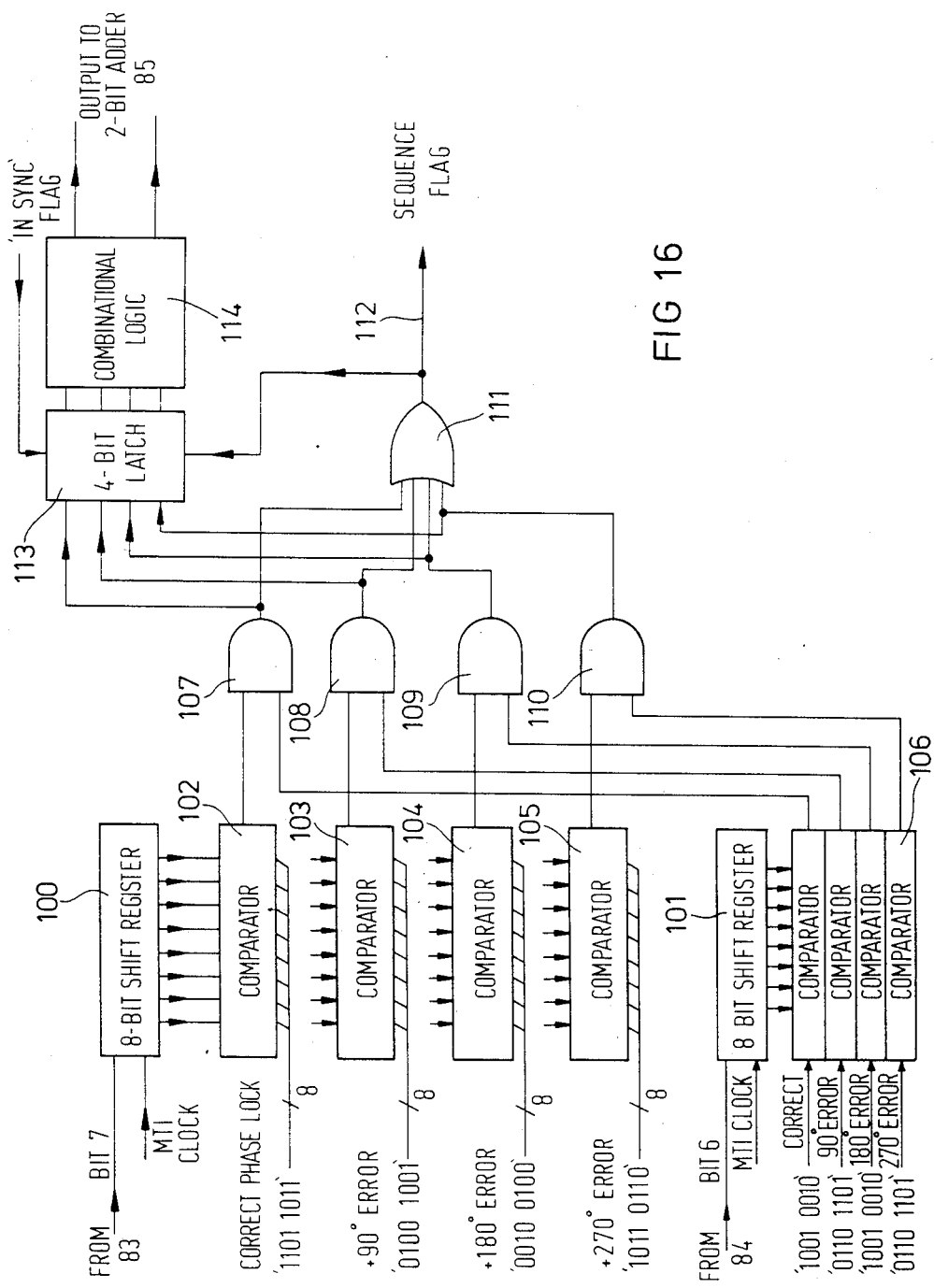
FIG. 16 is a circuit diagram of a reference sequence identification circuit of the FIG. 13 decoder.

Returning now to a consideration of the reference sequence identification circuit 90, this circuit is shown in block form in FIG. 16. The purpose of the identification circuit 90 is two-fold, namely (a) to identify the presence of the reference sequence in the incoming signal and thereby establish fixed points enabling the type of each succeeding symbol (i.e. whether a Q symbol or A symbol) to be established, and (b) to identify any phase lock error in the lock up of the oscillator 74. As previously described with reference to FIG. 10, the first nine symbols encoded during each two-line operating period of the apparatus constitute a reference sequence identifier, the value of these nine symbols being chosen to simulate a 7.16 MHz frequency which cannot be present in the encoded base band signal. In fact, examination of the two most significant bits of the first eight symbols in the identifier is sufficient to unambiguously detect this identifier. Accordingly, the reference sequence identification circuit 90 is provided with two 8-bit shift registers 100 and 101 to which are respectively fed bit-7 and bit-6 of each received symbol, the bits being clocked through the registers by the MTI clock output from the circuit 17. The current value of the 8-bit word held in each register is continuously compared with the value that that word would have if it were constituted by bit-7 (or bit-6 as appropriate) of the first eight symbols of the reference sequence identifier. Of course, the values of the bits-6 and -7 fed to the shift registers 100 and 101 will depend on whether the oscillator 74 has locked up correctly or has locked up 90°, or 180° or 270° in error; as a result, it is necessary to compare the value of the 8-bit word in each of the shift registers 100 and 101 with four different 8-bit sequences each corresponding to a particular phase lock condition. Thus, the contents of the bit-7 shift register 100 is fed to four 8-bit comparators 102, 103, 104 and 105 for comparison with 8-bit sequences respectively corresponding to correct phase lock, +90° phase lock error, +180° phase lock error and +270° phase lock error, the value of these sequences being shown in FIG. 16. Similarly, the contents of the bit-6 register 101 is fed to a block 106 of four 8-bit comparators for comparison with respective 8-bit sequences the values of which are indicated in FIG. 16.

The output of the bit-7 and bit-6 comparators associated with the correct phase lock condition are fed to an AND gate 107. Similarly, the outputs of the bit-7 and bit-6 comparators associated with the condition of 90° phase lock error, 180° phase lock error and 270° phase lock error are respectively connected to AND gates 108, 109 and 110.

In operation, as the bits 7 and 6 of each incoming signal are clocked into the registers 100 and 101, in due course the situation will be reached where the bits held in these registers correspond to the bits 7 and bits 6 respectively of the first eight symbols of the reference sequence identifier. At this point, one of the AND gates 107 to 110 will be enabled for one MTI clock period, that is until the contents of the registers 100 and 101 are changed. The identity of the enabled AND gate will, of course, depend on the phase lock condition of the oscillator 74. The outputs of the AND gates 107 to 110 are connected to a four input OR gate 111 to produce a sequence flag pulse on line 112 whenever the sequence identifier is detected. The outputs of the gates 107 to 110 are also fed to a 4-bit latch 113 clocked from the sequence flag line 112, the purpose of the latch 113 being to memorise the identity of the last enabled AND gate 107 to 110 (and thus memorise the phase lock condition of the oscillator 74. The output of the latch 113 is fed to combinational logic 114 arranged to produce an appropriate 2-bit output for feeding to the adder 85 to introduce any necessary correction, consequential on incorrect phase lock, into the symbol bits 7 and 6 fed to the demultiplexer 18. The values of the correction bits required are given in the following Table for each of the four possible phase lock conditions:

| PHASE LOCK CONDITION | ADD TO BIT 7 | BIT 6 |
|---|---|---|
| Correct | 0 | 0 |
| +90° Error | 1 | 1 |
| +180° Error | 1 | 0 |
| +270° Error | 0 | 1 |

Figure 17:
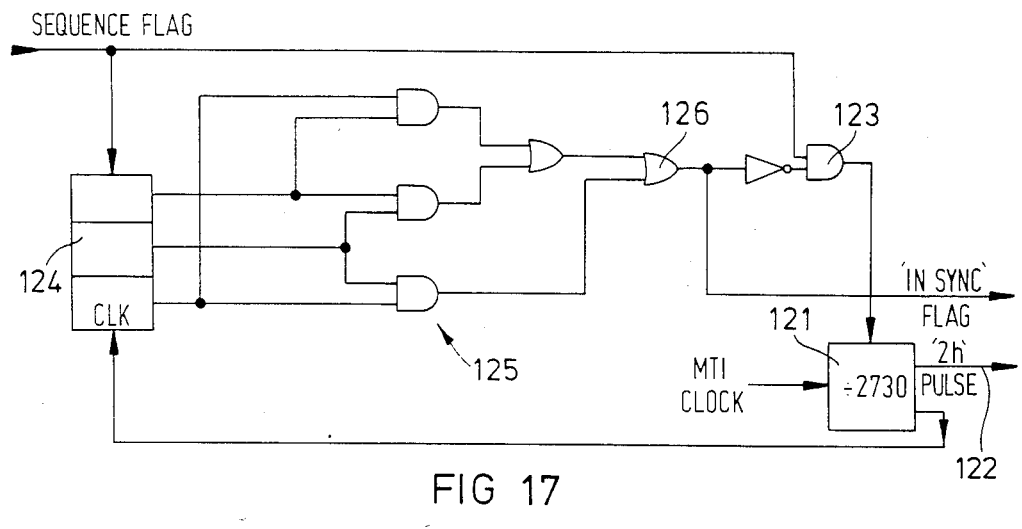
FIG. 17 is a circuit diagram of an "In Sync" flag circuit of the FIG. 13 decoder.

In addition to the reference sequence identification circuit 90, the synchronisation circuit 20 includes an "in Sync" flag circuit 120. This circuit 120 is arranged to produce a "2h" pulse marking the beginning of each two line cycle of operation of the decoder, and an "In Sync" flag is raised whenever the decoder has properly locked on to the reference sequences in the incoming signal., The "In Sync" flag circuit 120 is shown in FIG. 17. This circuit comprises a counter 121 arranged to cyclically count 2730 MTI clock pulses and output a pulse on a "2h" pulse line 122 at the end of every count cycle (at a count value of 2730). It will be recalled that 2730 MTI clock periods correspond to the two-line period 2h. Of course, in order for the pulses output by the counter 121 to constitute useful 2h pulses marking the start of each two-line cycle period, the operation of the counter must be synchronised in some way with the incoming signal. This synchronisation is achieved by arranging for the sequence flag output by the reference sequence identifier circuit 90 to set the counter to a particular count value whenever an AND gate 123 is enabled. Since the sequence flag is not produced right at the start of the reference sequence but only after the first eight symbols have been received, this flag is used to set the counter to a count of eight whereby the next 2h pulse output by the counter 121 2723 MTI pulses later, will correctly mark the beginning of a two-line cycle period. Of course, the counter 121 having finished one count will automatically restart counting at count one and not at the reset count value of eight.

When the decoder is properly synchronised with the incoming signal, the AND gate 123 is disabled preventing resetting of the counter 121 by the sequence flag pulses or, more importantly, by spurious signals produced on the sequence flag line for any reason. In this condition, the counter 121 continues to output 2h pulses on a regular basis. In order to check that synchronisation still exists, a second output of the counter 121 is used to clock a 3-bit shift register 124 fed with the sequence flag pulses from the circuit 90. This second output is produced at a count value of eight, that is, at the expected time of generation of a sequence flag pulse in each two-line cycle period. Provided that a sequence flag pulse arrives at the register 24 in synchronism with each pulse from the second output of the counter 21, the shift register 124 will be filled with three logic "1". However, should the sequence flag pulse be missing or the counter 121 be out of step, then upon output of a pulse from the second output pulse of the counter 121, a logic "0" will be entered into the shift register 124. The contents of the shift register 124 are analysed by logic circuitry 125 to produce a high signal at the output of a gate 126 of the circuitry 125 whenever at least two out of the three cells of the shift register 124 contain logic "1"; in other words, the "In Sync" flag constituted by the output of the gate 126 is produced whenever correct synchronisation between the output of of the counter 121 and the sequence flag pulse has been detected in at least two out of the last three occurrences of the pulse output from the counter 121.

If, however, the cells of the shift register 124 should contain two or three logic "0", then the output of the gate 126 will be low which serves not only to remove the "In Sync" flag but also results in the gate 123 being enabled so that the next sequence flag pulse will reset the counter 121 in order to try and re-establish synchronisation.

The arrangement of the circuit 20 minimises the effect of any noise related errors in the received signal by not only allowing for the occasional absence of a sequence flag pulse but also by ensuring that the shift register 124 will only accept pulses occurring at approximately the correct time.

Initially with all three cells of the shift register 124 containing logic "0", a train of three sequence flags without omission and without any intervening noise pulses must be presented to the circuit 120 before the "In Sync" flag will be produced.

The "In Sync" flag is fed back to the latch 113 of the reference sequence identification circuit 90 to inhibit changing of the latch contents whenever synchronisation exists. Due to this arrangement, any spurious output from the AND gates 107 to 110 when the apparatus is properly synchronised will not result in the latch contents being changed which could introduce an error into the correction bits fed from the combinational logic 114 to the 2-bit adder 85. When the "In Sync" flag is absent, the latch 113 operates normally with the sequence flag pulses clocking into the latch the input the input signals fed thereto from the gates 107 to 110.

Figure 18:
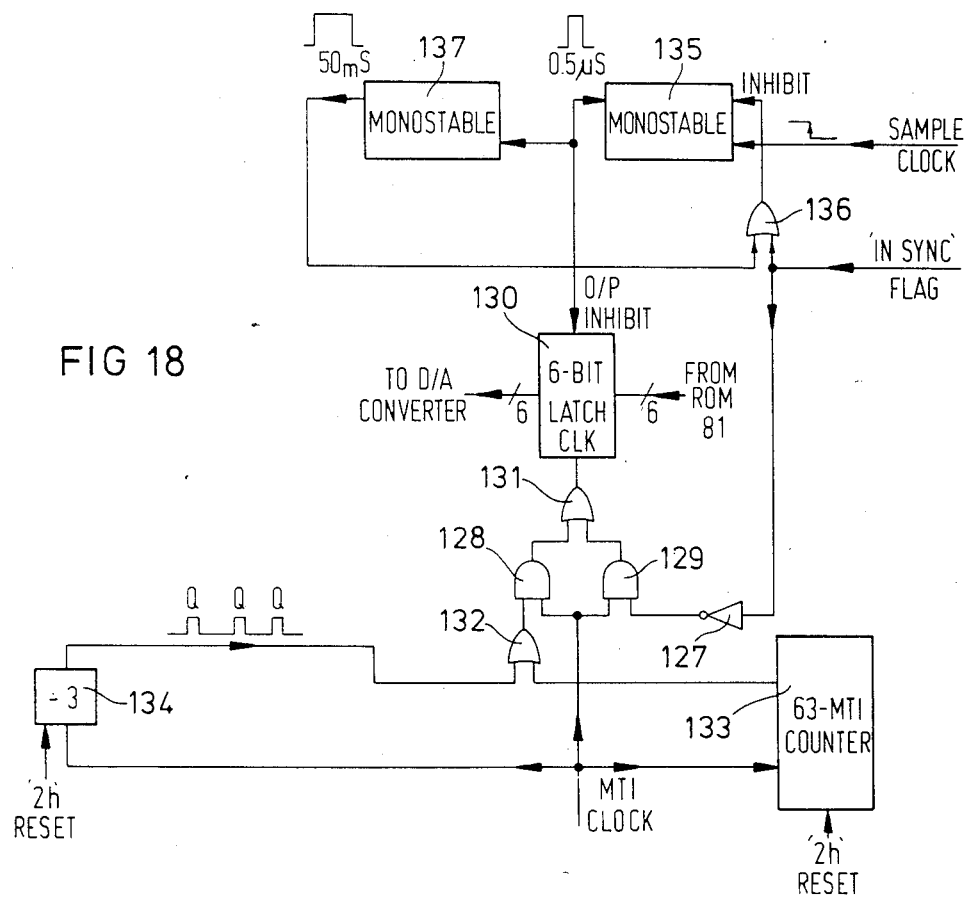

It is, in fact, conceivable that the phase locked loop controlling the oscillator 74 might lock up in a state other than one of the four states marked X in FIG. 14. If this were to happen, then of course the decoder would fail to carry out its decoding function. A characteristic of phase lock in a non-X state would be the absence of sequence flag pulses and thus absence of the "In Sync" flag. In order to prevent phase lock in a non-X state, the present decoder is therefore arranged to "kick" the phase locked loop out of lock up should the "In Sync" flag be absent for more than a predetermined period of time. This facility is provided by the feedback select circuit 86 which will now be described with reference to FIG. 18. The main element of the feedback select circuit is a 6-bit latch 130 fed with the output of the tan$^{-1}$ ROM 81, the outputs of the latch 113 being connected to the digital/analog converter 87. Whenever the "In Sync" flag is absent, the 6-bit signal on the input to the latch is clocked in by every MTI clock pulse; this is achieved by feeding MTI clock pulses to the clock input of the latch 130 via an OR gate 131 and a two-input AND gate 129 the second input of which is connected to the "In Sync" flag line through an inverter 127. As already explained, when the six LSB of each and every received symbol are fed back through the phase-locked loop, the loop will seek to lock up in a state in which the predominant in-quadrant $\phi$ value of the incoming signal produces at the output of the ROM 81 the value that equalises the frequency of the oscillator 74 with that of the incoming carrier signal; in the present case, the loop locks up with the predominant, and average value of $\phi = 45°$ producing a ROM output of 011 111 or 100 000.

Whenever the "In Sync" flag is set, the task of the phase-locked loop is eased by only clocking into the latch 130 the six LSB of the received Q symbols (which of course have in-quadrant values of $\phi = 45°$). To this end, MTI clock pulses are fed to a second input of the OR gate 131 via an AND gate 128 which is arranged to be enabled from an OR gate 132 whenever a Q symbol should be present. In each two-line cycle period, the first sixty three symbols can be treated as Q symbols since they all have one of the four values corresponding to $\phi$ equal to 45°, 135°, 225° and 315°. Accordingly, one input to the OR gate 132 is constituted by the output of a counter 133 which is arranged to produce a high output for the first sixty three MTI of each two-line cycle period; to this end, the counter 133 is reset by each 2h pulse and is clocked by the MTI clock.

Q symbols should also be present every third symbol starting with the first after the end of the sixty three symbol reference sequence. Accordingly, the gate 132 is fed with a second input which comes from a divide-by-three circuit 134 clocked by the MTI clock and arranged to produce a high output every third MTI clock pulse. A 2h pulse reset to the circuit 134 ensures that the first pulse output during each two-line cycle period occurs during the first MTI of that period whereby the circuit 134 will also produce pulses at the sixty fourth and every third subsequent MTI during the cycle period.

In this manner, when the "In Sync" flag is set the output of the ROM 81 will be set into the latch 130 whenever a Q symbol should be present, the latched-in 6-bit signal being fed forward to the converter 87.

In order to ensure that failure to synchronise is not due to an improper phase lock condition, the disappearance of the "In Sync" flag is used to remove an inhibit signal from a monostable 135, this inhibit signal being generated from the "In Sync" flag via an OR gate 136. With the inhibit signal to the monostable 135 removed, this monostable is triggered by the next rising edge of the sample clock to produce a 0.5 nanosecond pulse which is fed to an output-inhibit input of the latch 130. As a result, the latch contents are removed from the latch outputs and all high or all low values are inserted on the output lines; the effect of this is to perturb the phase lock loop and knock it out of lock up so that it has to search for a new lock up condition. To give the phase locked loop time to settle down again, the monostable 135 is inhibited for 50 /milliseconds following its last operation, this being achieved by using its output pulse to trigger a further monostable 137 which feeds a 50 millisecond pulse via the gate 136 to the inhibit input of the monostable 125.

The structure and operation of the de-multiplexer 18 will now be described with reference to FIGS. 19 and 20. The de-multiplexer 18 is arranged to process in trios the succession of 8-bit words fed thereto (bits 0 to 5 from ROM 81 and bits 6 and 7 from adder 85), each trio being treated as made up of one Q symbols followed by two A symbols. In order to reconstitute from each symbol trio the two 9-bit sample signals represented thereby, the demultiplexer 18 must strip bits 7 and 6 from the Q symbol and add bit 7 to the first following A symbol and bit 6 to the second following A symbol, the resultant two 9-bit words being output during two successive sample clock periods. To this end, the de-multiplexer 18 is provided with two 8-bit input latches 140, 141 which are clocked from the outputs of a divide-by-two circuit 142 fed with the MTI clock, the latches 140, 141 holding alternately received symbols for two MTI clock periods. A multiplexer 144 controlled by the output of a divide-by-six circuit 145 fed with the MTI clock pulses is arranged to alternately access the contents of the latches 140 and 141 in such a manner that the output of the multiplexer 144 is constituted by the successively received A symbols, the Q symbols being absent from the multiplexer output. Each A symbol output from the multiplexer 144 is held for one sample clock period in an 8-bit latch 147 the output of which constitutes the eight LSB of the demultiplexer sample-signal output. The MSB of each reconstituted sample signal is provided via a multiplexer 143 fed with bits 6 and 7 of the outputs of the latches 140 and 141, a two-bit latch 146 arranged to latch the output of the multiplexer 143, and a multiplexer 149 arranged to supply the two bits held in the latch 146 alternately to the demultiplexer output. The latch 146 and multiplexer 149 are controlled by the output of a divide-by-two circuit 148 fed with the sample clock pulses.

A fuller description of the operation of the demultiplexer 18 will now be given with reference to the FIG. 20 which shows the states of its various latches and multiplexers over eight MTI. ($MTI_1$ to $MTI_8$) during which the demultiplexer is supplied with the eight symbols $Q_1$, $A_{1-1}$, $A_{1-2}$; $Q_2$ $A_{2-1}$ $A_{2-2}$; and $Q_3$, $A_{3-1}$. It can be seen from FIG. 20 that each MTI clock period starts in the middle of a symbol, this being achieved, as already explained, in the clock recovery circuit with the object of ensuring that the demultiplexer 18 operates on mid-symbol values. The received symbols $Q_1$ to $A_{3-1}$ are alternately fed into the latches 140 and 141 by the anti-phase switching waveforms of period 2 MTI produced by the circuit 142, the latch inputs being set into the latches on the rising edge of the appropriate switching waveform. Thus, as shown, the latch 140 successively holds the symbols $Q_1$, $A_{1-2}$, $A_{2-1}$, $Q_3$ while the latch 141 successively holds the symbols $A_{1-1}$, $Q_2$, $A_{2-2}$, $A_{3-1}$.

Dealing first with the production of the MSB of the sample signals, the multiplexer 143 which, like the latch 141, is clocked by the upper output of the circuit 142, allows therethrough during successive MTI starting with $MTI_2$, bits 6 and 7 of the symbols $Q_1$, $A_{1-1}$, $A_{1-2}$, $Q_2$, $A_{2-1}$, $A_{2-2}$, and $Q_3$. It should be noted that all the multiplexers 143, 144 and 149 are arranged to pass the signals on their upper inputs when their controlling waveforms are high and to pass the signals on their lower inputs when the controlling waveforms are low. The signals output by the multiplexer 143 are set into the latch 146 under the control of the circuit 148 that divides down the sample clock by two. It will be seen from FIG. 20 that only the bits 6 and 7 of the Q symbols are entered into the latch 146. The multiplexer 149 then outputs, during successive sample clock periods, bit 7 of $Q_1$, bit 6 of $Q_1$, bit 7 of $Q_2$, and bit 6 of $Q_2$, these bits being fed to the output of the demultiplexer unit as the MSB of successive sample signals.

The feeding of the analog symbols 'o the latch 147 is effected by the multiplexer 144 under the control of the output of the divide-by-six circuit 145. As can be seen, the multiplexer 144 allows through in turn the symbols $A_{1-1}$, $A_{1-2}$, $A_{2-1}$, $A_{2-2}$, $A_3$.. These symbols are then clocked into the latch 147 by the sample clock and are each held in the latch for one sample period. The contents of the latch 147 are output as the eight LSB of the 9-bit sample signals produced by the demultiplexer 18. FIG. 20 clearly shows that the 8-bits of the $A_{1-1}$ symbol are output at the same time as bit 7 of the $Q_1$ symbol, the eight bits of the $A_{1-2}$ symbol are output at the same time as bit 6 of the $Q_1$ symbol and so on.

Of course, for the demultiplexer 18 to operate correctly the phases of the signals output from the circuits 142, 145, 148 as well as the sample clock phase must be as shown in FIG. 20 relative to the position of the Q symbols in the train of symbols fed to the demultiplexer 18. The required phasing is ensured by using the 2h pulse generated at the beginning of each two-line cycle period to set the circuits 142, 145 into states giving the outputs indicated during $MTI_1$ (the symbol fed to the demultiplexer at the start of the two-line cycle period being a Q symbol). The phase of the sample clock fed to the latch 147 and circuit 148 is also set at the beginning of each cycle period by a 2h pulse fed to a phase reset circuit 149.

The 9-bit sample signals output from the demultiplexer 18 are fed to a 9-bit digital/analog converter 150 to reconstitute the original analog samples waveform. The output of the converter 150 after passage through a filter 151 is connected to the input of a horizontal sync pulse insert circuit 152 where horizontal sync pulses are added into the reconstituted signal waveform. These sync pulses are produced by a horizontal sync generator 153 which is basically constituted by a counter arranged to count the sample clock pulses and to output a sync pulse every 1820 sample clock pulses. The counter of the sync pulse generator 153 is reset at the beginning of every two-line cycle period by a 2h pulse from the circuit 120 whereby to ensure that the horizontal sync pulses are generated at the correct time relative to the reconstituted waveform output from the converter 150.

The output of the sync pulse insert circuit 152 constitutes the baseband output of the receiver, this output being further processed in standard manner.

Variants of FIGS. 7–20 Embodiment

The encoding-decoding apparatus described with reference to FIGS. 7 to 20 can, of course, be varied in a number of respects and two significant variants will be outlined below by way of example.

In a first variant, the phase modulation encoding of the value of each symbol is varied from that used in FIGS. 7 to 20 where the symbols themselves effectively constituted a phase-setting signal the successive values of which were impressed on the carrier as absolute phase modulations relative to an established reference (this reference being established in the encoding apparatus by the unmodulated output of the oscillator 40, and re-established in the decoding apparatus by the unshifted output of the phase-locked oscillator 74). In the first variant, however, a differential encoding technique is used where the phase of the carrier during each MTI is shifted relative to the carrier phase during the preceding MTI by an amount set by the current symbol value. This encoding technique can be readily implemented by interposing an 8-bit adder and store (see dashed unit 199 in FIG. 7) between the output of the multiplexer unit 13 and the input of the modulator 14, the store being used to hold an 8-bit word that forms a phase-setting signal controlling the current phase impressed on the carrier, and each new 8-bit symbol word being added to the stored word in turn. In the decoder, the current symbol value is recovered by subtracting the current phase value of the received carrier from its value in the preceding MTI, the absolute value of the carrier phase being immaterial; this subtraction could be effected at the input to the demultiplexer 18 using a store and subtractor circuit (see dashed unit 200 in FIG. 13). As there is no longer any need to provide a time invariant phase reference, then provided the frequency of the oscillator 74 is approximately equal to that of the received carrier, phase-locked control of this oscillator can be dispensed with, the phase of the oscillator 74 between each two successive samples being taken as substantially constant (even though in absolute terms it is drifting relative to any particular phase modulation of the carrier).

In a second variant, each Q symbol is used to represent three 1-bit BLS signals, and accordingly has eight possible values as determined by the three MSB of the 8-bit word used to represent the symbol. In this variant, the latches 27 and multiplexer unit 13 are arranged to process the signal samples in trios and to represent each trio by one BLS-related Q symbol followed by three DS-related A symbols. In the decoding apparatus, the three MSB of each symbol are derived from the MSB bits output by the A/D converters 77, 78 and the MSB output from the $\tan^{-1}$ ROM 81, these three MSB determining, in the case of a Q symbol, the 1-bit BLS signal of each of three samples to be reconstituted by the demultiplexer 18 (the form of which is, of course different from that shown in FIG. 19 as now four symbols must be processed to provide three samples). As regards establishing phase lock of the loop including the oscillator 74, in order for the same value to be fed back from the ROM 81 regardless of the full value of each Q symbol, only the five LSB are utilised for the feedback signal. Of course, this will mean that phase lock can occur in any one of eight states so that the correction circuitry previously provided by the parts of the circuit 90 of FIG. 16 and the adder 85 has to be expanded to include eight comparators for detecting the identifier portion of the reference sequence, and a three-bit form of the adder 85 for adding correction bits top the three MSB of each symbol. In general terms, if each BLS signal is an n bit binary signal and each Q symbol has $2^m$ possible values (normally represented by the m MSB of a binary word), then each Q symbol can be used to represent m/n BLS signals, n and m each being a positive integer preferably $\leq 4$ and preferably 1 or 2; in this case, each n.m samples can be represented by $n^2$ Q symbols and n.m A symbols. Furthermore, by arranging for each of the $2^m$ possible values of a Q symbol to produce the same value of the LSBs of the binary signal output by the decoder $\tan^{-1}$ conversion means (constituted in the FIGS. 7 to 20 embodiment by the $\tan^{-1}$ ROM 81 and gates 83, 84), these LSBs can be used to achieve phase lock of the loop containing the oscillator 74. This is most readily achieved by (a) designing the encoder such that the $2^m$ possible values of a Q symbol translate to $2^m$ carrier modulation phases equi-angularly spaced around 360°, and (b) designing the decoder such that the full range of values of the binary signal output by the $\tan^{-1}$ conversion means is used to represent the full 360° range of carrier phase modulation. In this latter case, when a Q symbol is present, the binary signal output by the conversion means will represent by its m MSB bits the value of this symbol, the remaining bits of the signal being fed back to the phase locked loop. Identification in which of the possible $2^m$ states phase lock is achieved, is effected using $2^m$ comparators searching for the identifier portion of the reference sequence.

Time Division Multiplexing of Luminance and Chrominance

As is well known, colour television video signals generally take the form of a luminance signal suitable for driving black and white receivers, and two chrominance component signals which in combination with the luminance signal, are decoded in colour receivers to provide the requisite three colour channel signals. The luminance and chrominance signals are generally combined for broadcast into a composite video signal, and in the PAL and NTSC systems the two chrominance component signals are combined in a modulated chrominance signal which shares the higher frequency part of the video spectrum with the luminance signal; FIG. 21 shows the typical frequency spectrum of a composite video signal with curve 160 representing the luminance signal, curve 161 the chrominance signal, and curve 162 an added-on sound signal. In the embodiment of the invention described above with reference to FIGS. 7 to 20, the signal processed by the encoding-decoding apparatus is a composite video signal of the FIG. 21 form.

Frequency band sharing of the luminance and chrominance signals leads to imperfect separation of these signals during the decoding process. This problem, together with imperfect separation of the chrominance component signals from each other, has resulted in various undesirable effects being discernible in the reproduced television pictures. The foregoing drawbacks that result from the frequency band-sharing of the luminance and chrominance signals, can be largely overcome by the time division multiplexing (TDM) of the luminance and chrominance signals, this being done, in the context of the present invention, either with the signals in their original form to produce a combined signal for feeding to the sampling circuit of the encoding apparatus, or by separately sampling the signals and combining the resultant samples into a sample stream for feeding to the sample processing stage.

The time division multiplexing may be such that the first part of each line period is given over to chrominance signals while the latter part is used for luminance signals (as with the proposed MAC—multiplexed analogue component - system where each 64 μs line period, 20 μs are used for the chrominance signal and 40 μs for a time-compressed luminance signal). The resultant TDM signal could be supplied direct to the input of the described encoder (the sync stripper 21 being omitted if not required).

In a proposed alternative TDM scheme, luminance and chrominance samples are alternated more often, with for example, every seven samples processed being made up of two chrominance samples and five luminance samples. Furthermore, to ensure good separation of the two chrominance component signals, rather than alternating every chrominance sample between the two component signals, one component signal can be sampled during one television line period and the other component signal during the next line period (in a manner akin to the SBCAM system).

This latter TDM scheme for separate sampling of the luminance and chrominance signals could be implemented for the embodiment of FIGS. 7 to 20 by supplying the input of the 9-bit analog/digital converter 10, 11 FIG. 7) from the output of a multiplexer separately fed with the luminance and chrominance component signals; a sound channel could also be supplied to the multiplexer, this channel being sampled less frequently than the luminance or chrominance channels. The multiplexing sequence would, of course, need to be a predetermined relation to the cycle start point marked by the 2h pulse in order to enable the decoding apparatus to identify samples as luminance, chrominance or sound samples.

In order to illustrate the breadth of the present invention, rather than describing in detail how separate sampling of the luminance and chrominance signals could be carried out for the FIGS. 7 to 20 embodiment, an implementation of this technique will be described for a form of encoding-decoding apparatus (FIG. 22) in which the BLS-representing first modulation and the DS representing second modulation are both phase modulations impressed on a carrier during the same MTI.

The encoder shown in the upper half of FIG. 22 comprises a luminance encoding circuit 163 arranged to receive a luminance signal L, and a chrominance encoding circuit 164 arranged to receive a signal C from the output of a multiplexer 165 fed with two chrominance component signals C1, C2. The multiplexer 165 is controlled by a line pulse "h" from the clock circuit 15 of the apparatus and is so arranged that for one raster line the chrominance signal C is constituted by one chrominance component signal $C_1$, while for the next line the signal C is constituted by the other chrominance component signal $C_2$ and so on in alternation.

Each encoding circuit 163, 164 repeatedly samples the signal fed thereto at the sample clock rate and analyses each sample into a four-bit binary BLS signal and a PAM (pulse amplitude modulated) DS signal. FIG. 23 shows the sixteen possible quantisation levels corresponding to the sixteen possible values of the BLS signal. For the illustrated sample $S_4$ of the waveform W, the BLS signal will have a binary value of "1000", while the DS signal will be a pulse of an amplitude corresponding to the difference between the "1000" quantisation level and the actual waveform level.

The 4-bit BLS signals generated by the repeated sampling of the luminance and chrominance signals L and C are fed from the encoding circuits 163, 164 to a digital multiplexer 166 while the corresponding analog DS signals are fed from the encoding circuits 163, 164 to an analog multiplexer 167. Also fed to the digital multiplexer 166 are a digital sound-channel signal and a digital data-channel signal. In the digital multiplexer 166, the 4-bit BLS signals corresponding to selected ones of the luminance and chrominance signal samples are time division multiplexed with the sound and data channel signals to form a succession of 3-bit Q-symbols with ten such symbols constituting a symbol frame of thirty bits. One such frame is illustrated in FIG. 24 with the ten constituent Q-symbols being referenced $Q_1$ to $Q_{10}$ (note, although the thirty bits making up the frame are shown in a serial arrangement, it will generally only be the symbol that are serially produced, the bits of each symbol being output in parallel and not one after the other). The arrangement of the multiplexer 166 is such that the thirty constituent bits of each frame are derived from five four-bit BLS luminance-sample signals, two four-bit BLS chrominance-sample signals, one sound-channel bit and one data-channel bit. In the bit organisation illustrated in FIG. 24, the two BLS chrominance-sample signals are divided into four bit-pairs 170 lying between the five BLS luminance-sample signals 171, the sound-channel bit 172 and data-channel bit 173 completing the thirty bit frame.

Each of the ten Q-symbols in a frame is output in parallel form from the multiplexer 166 during a corresponding MTI, there being ten MTI to a frame.

The duration of each word frame is, for example, 500 nS so that the overall bit rate is 60M bits per sec; the sound channel thus has a bit rate of 2M bits per sec which is sufficient for three stereo channels.

The details of how the digital multiplexer inputs are organised into the FIG. 24 format will not be given herein since the construction of a suitable multiplexer is within the competence of persons skilled in the relevant art. Thus, it is clear that the multiplexer will include latches for retaining the required BLS signals, the sample clock being supplied to the multiplexer to time the clocking of these latches. Furthermore, the MTI clock is fed to the multiplexer to control the output of successive 3-bit Q symbols.

During each ten-MTI frame, the analog multiplexer 167 is arranged to time division multiplex the DS signals produced from the same seven samples as selected by the digital multiplexer. The sevel selected DS signals constitute respective A symbols and are output from the analog multiplexer 167 during respective MTI of the frame, zero outputs being produced during the remaining three MTI in each frame. In the present example, the DS-related A symbols of the five selected luminance samples are output during respective ones of the first, third, fifth, seventh, and ninth MTI of each frame, while the A symbols of the two chrominance samples output during the second and sixth MTI. The output of the multiplexer 167 is zero during the fourth, eighth and tenth MTI.

The 3-bit Q symbols successively output from the digital multiplexer 166 and the A symbols output from the analog multiplexer 167 are respectively fed to first and second inputs of a phase modulator 168, these Q and A symbols together constituting a composite modulation output used to control the modulator 168. During each MTI the phase modulator 168 is arranged to modulate a carrier wave in dependence on the combined value of a quantised first modulation set by the value of the Q symbol currently output by the multiplexer 166, and an analog second modulation set by the value of the A symbol currently output by the multiplexer 167 (during certain MTI, this latter value is, as already mentioned, zero).

Since each Q symbol is three bits in length, the first modulation can taken on eight possible values and the modulator 168 is so designed that these values correspond to eight equally spaced phases of the carrier wave (see dashed lines in FIG. 25).

Superimposed on the eight-level phase modulation produced by the Q symbol is a low level modulation (see arcuate arrows in FIG. 25) determined by the value of the DS-related A symbol. The range of the second modulation is less than that between adjacent ones of the eight phase-modulation levels determined by the Q symbol. This restriction avoids ambiguity. In practice, the range of the second modulation is limited to $\pm\pi/6$ radians to reduce the risk of noise causing error in transmission of the first modulation.

The decoder is shown in block diagram form in the lower half of FIG. 22. This decoder comprises a phase demodulator 180 the input of which will generally come from the IF circuitry of a Satellite television receiver. The demodulator 180 is arranged to determine which of the eight possible basic phase levels (that is, the levels set by the first modulation of the phase modulator 168) is nearest to that of the incoming signal; once this level has been identified, a corresponding three-bit data word is fed to a digital demultiplexer 181 while the difference between the identified basic level and the actual phase of the signal determines an analog output fed to an analog demultiplexer 182. The digital demultiplexer 181 is arranged to sort out the luminance and chrominance data bits and reconstitute the four-bit BLS signals fed to the multiplexer 166 of the encoder. The luminance BLS signals are fed to a digital/analog converter 183 while the chrominance BLS signals are fed to a digital/analog converter 184. The sound channel bit and data channel bit of each frame are output on lines 185 and 186 respectively.

The outputs of the converters 183 and 184 are fed to respective summing circuits 187 and 188 which also respectively receive the luminance and chrominance DS signals from the analog demultiplexer 182. The summing circuit 187 outputs reconstituted luminance samples at a rate of 10M samples per second and these are filtered in a filter 180 to a bandwidth of 4.7 MHz. The summing circuit 188 outputs reconstituted chrominance samples at a 4M/second rate and these samples are filtered by a filter 190 to a bandwidth of 1.9 MHz. Both the sound channel and data channel have a bit rate of 2M bits/sec.

The initial phase reference for the phase demodulator 180 is provided by a short synchronisation signal inserted by the digital multiplexer 166 of the encoder at the beginning of every second television raster line, the output of the analog multiplexer 167 being held at zero during this synchronisation signal. The timing of the synchronisation signal is under the control of a two-line period pulse "2h" output from the clock circuit 15. Between synchronisation signals, phase tracking is done by looking at the phase of the received signal during the three MTI of each frame for which the second modulation is known to have a zero value; clearly, any phase tracking error can be readily identified during these MTI and used to effect correction. Frame and data word timing is also provided at the beginning of every second line by the synchronisation signal, this synchronisation information being extracted respectively by a sync recovery circuit 20 and by a clock recovery circuit 17 of the decoding apparatus and being fed to the demultiplexers to enable them to sort out and identify the signals received during successive MTI.

In the foregoing embodiment the risk of crosstalk between the luminance and chrominance channels is minimised due to the sequential nature of the transmission of chrominance and luminance information. However, one potential source of crosstalk is interference between adjacent symbols if the overall amplitude and phase frequency response goes outside specification. As a precaution, it may therefore be prudent to re-arrange the distribution of information within each symbol frame so that the luminance and chrominance signals are better separated; for example, the A symbols relating to luminance could be transmitted during the first five MTI associated with each frame while the chrominance A symbols can be transmitted in the eighth and ninth MTI.

From the foregoing it can be seen that the described broadcast-television encoding-decoding methods and apparatus combine the advantages of digital and analog transmission by dividing each sample into a coarsely quantised BLS signal and a high resolution DS signal.

The advantages that accure due to digital transmission are: limited impairment due to noise; the straightforward implementation of time division multiplexing; and the possibility of encryption which may be required for a subscriber type of service. The transmission of an analog component ensures band width efficiency and a demodulated signal to noise ratio that improves as the transmission signal to noise ratio is increased.

Regarding the signal to noise ratio of the apparatus, assuming no transmission errors, the BLS components of the television signals are faithfully reproduced noise free. As for the DS components which produce the fine detail information, although these components are not received noise free, the effects of this noise is limited to low level. Thus when the BLS components and DS components are added, the noise voltage at maximum can only be a fraction of the total maximum signal reconstituted in the decoder.

Furthermore, where the luminance and chrominance signals are separately sampled, the demodulated luminanceand chrominance channels will have equal signal to noise ratios and suffer equal degradation during impaired transmission conditions. The separate sampling and sequential transmission of the luminance and chrominance signals minimises crosstalk therebetween.

It will, of course, be appreciated that the general principle of representing a signal by a hybrid coarsely quantised BLS/high resolution DS combination can be used in applications other than colour television broadcasting, such as communication systems in general (including radio broadcasting), and magnetic recording in general (including video tape recording).

The modulator and demodulator units of the FIGS. 7 to 20 embodiment can also be usefully used for a high-speed data transmission link, with each symbol being a Q symbol, preferably with four levels representing two data bits (giving a bit rate of 42 M bits/sec); alternately, each Q symbol could have eight levels representing three data bits (giving a bit rate of 63 M bits/sec).

In the case where each Q symbol represents two binary bits and the data bits to be transmitted are supplied to the encoder in serial form at twice the MTI clock frequency, these bits can be organised into pairs for feeding to the modulator 14 by means of a circuit comprising: an input demultiplexer connected to receive the incoming data bits and having four 1-bit output lines, four 1-bit latches connected to respective output lines of the demultiplexer, and an output multiplexer having two 2-bit wide inputs each connected to a respective pair of the latches and a 2-bit wide output. By appropriately clocking the demultiplexer and latches at twice the MTI clock rate, the incoming bits are cyclically input into the four latches with each bit being retained for two MTI. The output multiplexer is controlled by a switching waveform at half the MTI clock rate to output the contents of one pair of the latches over one MTI and the contents of the other pair of latches in the next MTI, and so on in alternation. The switching of the output multiplexer is so phased relative to the clocking of the demultiplexer and latches that the contents of the latch pair producing the multiplexer output are invariant for the relevant MTI.

Figure 12:
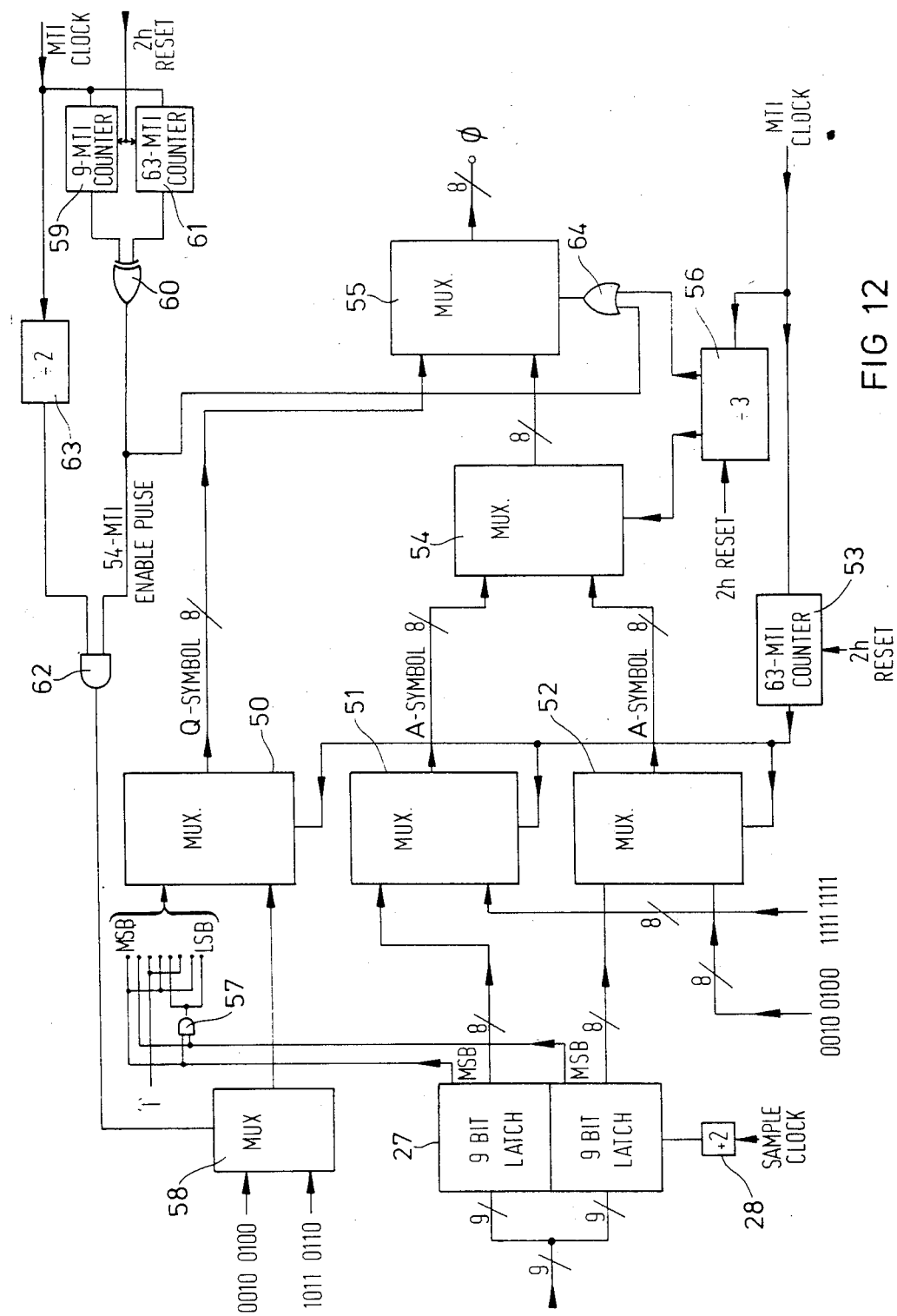
FIG. 12 is a block diagram of a multiplexer unit of the FIG. 7 encoder.

For direct use with the modulator 14 to FIG. 7, the 2-bit output of the multiplexer could be converted into an 8-bit output by the network shown at the input to the multiplexer 50 in FIG. 12.

Of course, the modulator could take a different form to that shown in FIG. 7 since now only four different phases of modulation are required.

The decoding of a stream of data-representing Q-symbols can be effected using the decoder of FIG. 13 modified by the replacement of the demultiplexer unit 18 with a simpler demultiplexer unit fed with data bits only from the output of the two-bit adder 85; the circuits 150–153 would, of course, not be required. In order to convert successive bit pairs (bits '6' and '7' in FIG. 13) into a serial format, the demultiplexer unit could take the form of two 2-bit latches fed in common with the output of the adder 85 and each having two outputs (one for each bit held in the latch) connected to a respective input of a multiplexer provided with four 1-bit inputs and one 1-bit output. By clocking the latches in anti-phase at half the MTI clock rate, successive pairs of bits '6', '7' are fed alternately to the two latches where they are held for 2 MTI. By switching the multiplexer between its inputs at twice the MTI clock rate the contents of the four cells provided by the latches are cyclically used to form the demultiplexer output, the phasing of the multiplexer switching relative to the clocking of the latches being such that the contents of the currently used cell are constant during the relevant half MTI.

The reference sequence identified by the reference sequence identification circuit 90 could be kept the same as already described by arranging for the transmitted data never to include such a sequence (for example, by transmitting known sequence-breaking symbols after every five data symbols). However, it is preferable to alter the reference sequence to a more suitable one. Thus, where the data transmitted has been subject to Manchester II encoding (every data bit being followed by its compliment), then the reference sequence to be identified could simply be a series of binary '1', a sequence which could not occur with the data bits. The fixed words fed to the comparators of the circuit 90 would, of course, need to be appropriately modified.

It will be appreciated that although the output of the ROM 81 is no longer used for the detector output, the fine phase angle information contained in this output is still required to ensure stable locking of the phase locked loop controlling the oscillator 74. Futhermore, since every symbol received would be a Q symbol, the latch 130 of the circuit 86 (FIG. 18) could be clocked directly from the MTI clock.

The variants discussed above in relation to the apparatus of FIGS. 7 to 20 can also be applied to this apparatus when modified for Q symbol transmission only. Furthermore, the data bits rather than being input and output in serial form as described above, could be organised into words supplied to and from the apparatus in parallel form.

I claim:

1. In a communications system, encoding-decoding apparatus comprising an encoder for encoding information signals prior to transmission and decoder for decoding the received transmissions, characterised in that the encoder comprises:

signal processing means (10,11) arranged to sample the information signals sequentially and to represent each sample (S) by the combination of a base-level signal BLS indicative of a coarse level quantisation of the sample (S), and a difference signal DS providing a high resolution measurement of the difference between the actual sampled signal level (W) and the quantisation level represented by the BLS signal, encoder signal-organising means (13) arranged to receive and organise said BLS and DS signals into a composite modulation output that is divided into a succession of modulation time intervals MTI and includes, at least when considered over a number of MTI, both coarsely-quantised BLS-related components hereafter referred to a Q symbols, and high-resolution DS-related components hereafter referred to as A symbols, each symbol being monovalued and occupying one MTI, a carrier signal oscillator (40) for generating a carrier signal, and a modulator (14) responsive to the Q and A symbols of the composite modulation output to modulate said carrier signal respectively with a coarsely quantised first modulation indicative of said BLS signals and with a high resolution second modulation indicative of said DS signals; and in that the decoder comprises:

a demodulator (16) arranged to receive the modulated carrier signal and to demodulate said first and second modulations to produce a composite demodulated output with Q symbol and A symbol components indicative of the corresponding symbols of the encoder composite modulation output, decoder signal-organising means (18) connected to receive the composite demodulated output and to provide therefrom signals corresponding to the BLS and DS signals of the decoder; and signal recombining means (19) arranged to receive and combine the said signals provided by the decoder signal-organising means (18) to reproduce the information-signal samples in their original sequence.

2. Apparatus according to claim 1, wherein the signal processing means (10,11) of the encoder is arranged to represent each sample as a multi-bit binatry signal, the most significant n bits of this latter signal constituting the said BLS signal where n has any one of the values 1, 2, 3, and 4, and the remaining, least significant bits constituting the DS signal.

3. Apparatus according to claim 2, wherein each sample is represented by a 9-bit binary signal and n=1.

4. Apparatus according to claim 1 wherein the encoder signal-organising means (13) is such that the DS signal of a said sample (S) is represented by a respective A symbol while the corresponding BLS signal is represented by a part or the whole of one or more Q symbols, the composite modulation output being constituted during each MTI by both a said Q symbol and a said A symbol.

5. Apparatus according to claim 1, wherein the encoder signal-organising means (13) is such that the DS signal of a said sample (S) is represented by a respective A symbol while the corresponding BLS signal is represented by a part or the whole of one or more Q symbols, the Q and A symbols occupying different MTI in the composite modulation output.

6. Apparatus according to claim 5, wherein the BLS signal of each sample is an n-bit binary signal where n has any one of the values 1, 2, 3 and 4 and each Q symbol has $2^m$ possible values where m has any one of the values 1, 2, 3 and 4, each Q symbol serving to represent m/n BLS signals whereby each m.n samples are represented by $n^2$ Q symbols and m.n A symbols.

7. Apparatus according to claim 6, wherein n=1 and m=2, the encoder signal-organising means (13) being arranged to form the BLS and DS signals of successive pairs of samples (5) into one Q symbol and two A symbols, and the decoder signal-organising means (18) being arranged to derive from the Q symbol of each trio of symbols constituted by one Q symbol and the associated two A symbols, two 1-bit BLS signals with each of which it then associates the DS signal represented by the corresponding A symbol.

8. Apparatus according to claim 6, wherein n=1, and m=3, the encoder signal-organising means (13) being arranged to form the BLS and DS signals of successive trios of samples into one Q symbol and three A symbols, and the decoder signal-organising means (18) being arranged to derive from the Q symbol of each quartet of symbols, constituted by a Q symbol and the associated three A symbols, three 1-bit BLS signals with each of which it then associates the DS signal represented by the corresponding A symbol.

9. Apparatus according to claim 5, wherein the modulator (14) of the encoder is a phase modulator and said first and second modulations are both phase modulations, the modulator (14) phase modulating the carrier signal in dependence on the value of the current symbol without regard to the Q/A identity of the latter, and the encoder signal-organising means (13) being arranged to insert at predetermined intervals into the succession of sample-representing symbols output thereby, a uniquely-identifiable reference sequence relative to which the Q and A symbols occur in predetermined order; the demodulator (16) of the decoder being arranged to output a series of symbols having values determined by the phase modulation of the received carrier signal during corresponding MTI, and the decoder including a reference-sequence identification circuit (90) arranged to identify said reference sequence and to synchronise the decoder signal-organising means (18) such that the symbols received thereby are appropriately treated as Q or A symbols.

10. Apparatus according to claim 9, wherein the modulator (14) is arranged to impress the value of each symbol on the carrier signal as a shift in carrier phase relative to an absolute encoder phase reference corresponding to the phase of the carrier signal in the presence of a zero-valued symbol, the value of each symbol itself constituting a phase-setting signal directly determining the value of phase modulation of the carrier; the demodulator (16) being arranged to compare the current phase of the received carrier with a reference phase, established therefrom and corresponding to a particular carrier modulation, whereby to produce an angle signal representative of the value of the current phase modulation and constituting said demodulated output of demodulator (16).

11. Apparatus according to claim 9, wherein the modulator (14) is such that the value of each symbol is impressed on the carrier as a shift in carrier phase relative to its phase during the preceding MTI, the modulator

(40) including differential encoding means (199) fed with the symbols from the encoder signal-organising means (18) and arranged to form a phase-setting signal directly determining the phase of the carrier, the value of the phase-setting signal being the sum of its value during the preceding MTI and the current symbol value; the demodulator (16) being arranged to compare the phase of the received carrier with a reference phase established in the demodulator (16) whereby to produce an angle signal dependent on the phase difference therebetween, the demodulator (16) including differential decoding means (200) arranged to receive said angle signal and to determine the difference in carrier phase between successive MTI, this phase difference being output as the said demodulated output of the demodulator (16).

12. Apparatus according to claim 10, wherein said phase-setting signal is digitally encoded, the phase modulator of the encoder comprising:

a sin $\phi$ converter (30) and cos $\phi$ converter (31) both fed with said phase-setting signal and respectively arranged to output digital sin $\phi$ and cos $\phi$ signals where $\phi$ is an angle represented by the value of said phase-setting signal, respective digital analog converters (32, 33) for converting the digital sin $\phi$ and cos $\phi$ signals to analog form, a first multiplier (36) arranged to receive and combine the analog cos $\phi$ signal with the carrier signal, a second multiplier (37) arranged to receive and combine the analog sin $\phi$ signal with the carrier signal phase shafted by IV$_2$, and summing means (42) connected to receive and sum the outputs from said first and second multipliers (36,37), the output of the summing means (42) constituting the carrier signal phase modulated by $\phi$.

13. Apparatus according to claim 11, wherein said phase-setting signal is digitally encoded, the phase modulator of the encoder comprising:

a sin $\phi$ converter (30) and cos $\phi$ converter (31) both fed with said phase-setting signal and respectively arranged to output digital sin $\phi$ and cos $\phi$ signals where $\phi$ is an angle represented by the valve of said phase-setting signal, respective digital/analog converters (32,33) for converting the digital sin $\phi$ and cos $\phi$ signals to analog form, a first multiplier (36) arranged to receive and combine the analog cos $\phi$ signal with the carrier signal, a second multiplier (37) arranged to receive and combine the analog sin $\phi$ signal with the carrier signal phase shifted by $\pi/2$, and summing means (42) connected to receive and sum the outputs from said first and second multipliers (36, 37), the output of the summing means (42) constituting the carrier signal phase modulated by $\phi$.

14. Apparatus according to claim 9, wherein each Q symbol has $2^m$ possible values where m is any one of the numbers 1, 2, 3 and 4, these values being such that the corresponding $2^m$ possible phase modulations of the carrier signal are equi-angularly spaced relative to each other around the four angle quadrants.

15. Apparatus according to any one of claims 10 to 14, wherein the demodulator (16) conprises:

an oscillator (74) having an output of the same frequency as the received carrier signal, the phase of the oscillator output constituting the demodulator reference phase;

a first multiplier (72) arranged to receive and combine the received carrier signal with the output of the oscillator (74), a second multiplier (73) arranged to receive and combine the received carrier signal with the output of the oscillator (74) phase shifted by $\bar{\pi}/2$, first and second low pass filters (75,76) respectively connected to the outputs of the first and second multipliers (73, 74) and arranged to filter out signal components above the carrier signal frequency whereby the filter outputs respectively represent sin $(\theta+\phi)$ and cos $(\theta+\phi)$ where $\phi$ is the carrier phase modulation angle caused by said phase-setting signal and $\theta$ is the phase angle by which the oscillator output would lag behind the received carrier were the latter to carry zero modulation, respective analog/digital converters (77,78) for converting the filter outputs to digital signals, and conversion means (81,83,84) arranged to receive the output of the analog/digital converters (77, 78) and to generate therefrom a binary signal indicative of the value of the modulation angle $\phi$, this latter signal constituting the said angle signal.

16. Apparatus according to claim 15 when dependent on claim 14, wherein the conversion means (81,83,84) of the demodulation is such that the full range of values of the binary angle signal corresponds to the full 360° range of the quantity $\phi$, the decoder signal organising means (18) being arranged to use the m most significant bits of the said binary angle signal to determine the value of each Q symbol.

17. Apparatus according to claim 16, wherein the digital signal output from each analog/digital converter (77,78) contains one bit serving as a sign bit, said conversion means including a logic circuit (83,84) arranged to utilise said sign bits to determine the quadrant of the current phase modulation $\phi$ and thus the two most significant bits of said binary angle signal, and a converter circuit with a look-up table (81), the converter circuit being connected to receive the unsigned digital sin $(\phi+\theta)$ and cos $(\phi+\theta)$ signals and arranged to produce a multi-bit binary representation of the in-quandrant value of the modulation $\phi$, said binary representation forming the least significant bits of the binary angle signal.

18. Apparatus according to claim 16, wherein the oscillator (74) of the demodulator (16) is controlled by a phase-locked loop (72 to 74, 81, 86 to 89) such that the phase of the oscillator output corresponds to a particular modulation of the received carrier signal, the said binary angle signal stripped of its m most significant bits, being utilised by said phase locked loop (72 to 74, 81, 86 to 89) to achieve phase lock, the value of the stripped angle signal being the same for each Q symbol, and the decoding apparatus further comprising state-of-lock detection means (90,85) for detecting in which of $2^m$ possible states within the four angle quadran phase lock is achieved and for adjusting the value of the m most significant bits of said angle signal to take account of the identity of the state in which lock has been achieved.

19. Apparatus according to claim 18, wherein the said reference sequence inserted into the succession of sample-representing symbols by the encoder signal-organising means (13) comprises a train of p symbols, where p is a positive inteter 1, these symbols having values arranged to produce in at least certain ones of the bits of said binary angle signal, a sequential combination of values that could not result from the encoding of said information signals, the reference-sequence identification circuit (90) including storage means (100,101) for storing the values produced during the last preceding p MTI of said at least certain ones of the angle signal bits, and comparator means (103 to 106) for comparing the bit pattern held in said storage means with $2^m$ reference bit patterns each corresponding to the bit pattern that would be produced by said train of p symbols with the phase-locked loop locked in a respective one of said $2^m$ states, said comparator means (103 to 106) being arranged to generate an output upon detecting equality between the stored bit pattern and one of the reference bit patterns whereby to indicate the presence of said reference sequence; the state-of-lock detection circuit (90,85) being formed in part by said identification circuit (90) with the comparator means (103 to 106) of the latter being arranged to provide an indication of which of the $2^m$ states the loop (72 to 74, 81, 86 to 89) has achieved phase lock.

20. Apparatus according to claim 19 wherein the encoder includes an input filter (20) for limiting the frequency range of the information signals, the said train of symbols of the reference sequence being arranged to represent a signal of a frequency outside said range.

21. Apparatus according to claim 15, wherein the encoder signal-organising means (13) is arranged to insert intermittently into said succession of sample-representing symbols, a series of clock synchronisation symbols having values such that the phase of the carrier changes by substantially $\pi$ radians between every MTI in which the clock synchronisation symbols are present; the decoder including a clock recovery circuit (17) comprising two full wave rectifier bridges (91,92) connected together on their d.c. sides and respectively fed from the outputs of the first and second filters (75,76), a voltage-controlled clock (95), and a phase locked loop (93,94) arranged to lock up the clock (95) to the fluctuations present across the d.c. sides of said rectifier bridges (91,92) during receipt of said clock synchronsiation symbols by the demodulator (16), the loop including a phase comparator (93) arranged to produce a controlling voltage for the clock (95) in dependence on the phase difference between the said d.c. voltage fluctuations and a signal derived from the clock input.

22. In a communications system for the direct broadcast of television by satellite, apparatus according to claim 1 wherein said information signals are colour television signals provided in the form of a composite video signal.

23. In a communications system for the direct broadcast of television by satellite, apparatus according to claim 1 wherein said information signals are colour television signals provided in the form of separate luminance and chrominance signals, the signal processing means (163, 164,165) of the encoding apparatus being arranged to time division multiplex together the luminance and chrominance signals either before or after sampling these signals.

24. In a communication system for the direct broadcast of television by satellite, apparatus according to claim 1 wherein said information signals are colour television signals provided in the form of successive digital words, the signal processing state (10, 11) of the encoding apparatus being arranged to treat each digital word as a signal sample and to utilise at least one of the most significant bits of said word as the BLS signal and the remaining bits as said DS signal.

25. A decoder for use in the I.F. strip of a DBS receiving unit, characterised in that the decoder comprises:

a phase demodulator (16) arranged to compare the phase of an incoming phase-modulated carrier with a reference phase established in the demodulator (16) whereby to produce a binary symbol signal representing a succession of symbols (Q,A) that have been phase modulated onto the carrier during respective modulation time intervals (MTI) and are together indicative of an information signal, a synchronisation circuit (20) arranged to monitor said symbol signal and to produce a sync signal (2h) on the occurrence of a predetermined reference sequence in said succession of symbols (Q, A), and signal-organisation means (18) connected to receive both the symbol signal and the sync signal (2h), the signal-organising means (18) being arranged to derive for each sucessive group of $(n.m+n^2)$ symbols occurring in said succession symbols, m.n n-bit binary base-level signals (BLS) by utilising the $n^2$ sets of m bits provided by the most significant m bits of the symbol signal during $n^2$ selected symbols (Q) of the group, each resulting base-level signal (BLS) being output in turn by the signal organising means (18) along with a respective binary difference signal (DS) constituted by the symbol signal when representing a respective predetermined one of the symbols of the group, the bits of the base-level signals (BLS) and difference signal (DS) respectively forming the most and least significant bits of a binary word representing a sample of said information signal, and the position of the said selected and predetermined symbols (Q,A) within the said succession of symbols being referenced by the signal-organising means (18) to the occurrence of the reference sequence in said succession as indicated by the sync signal (2h), n and m being positive integers each having any one of the values 1,2,3 and 4.

26. A method of encoding information signals to reduce possible distortion of their information content as a result of noise, characterised in that the method comprises the steps of:

representing successive samples of said information signals by the combination of a base-level signal BLS indicative of a coarse level quantisation of a sample (S), and a difference signal DS providing a high resolution measurement of the difference between the actual sampled signal level (W) and the quantisation level represented by the BLS signal, modulating a carrier signal respectively with a coarsely quantised first modulation indicative of said BLS signals and with a high resolution second modulation indicative of said DS signals, whereby the first modulation as a result of its lower number of possible states has a higher noise immunity than the second modulation so that the BLS signals are less suceptible to noise than the DS signals.

* * * * *

UNITED STATES PATENT AND TRADEMARK OFFICE
CERTIFICATE OF CORRECTION

PATENT NO. : 4,575,709
DATED : March 11, 1986
INVENTOR(S) : Martin Tomlinson

It is certified that error appears in the above-identified patent and that said Letters Patent are hereby corrected as shown below:

On page 1, column 1, after

[73] Assignee: delete,

"General Electric Company, Portsmouth, VA"

Signed and Sealed this

Ninth Day of December, 1986

*Attest:*

DONALD J. QUIGG

*Attesting Officer*   *Commissioner of Patents and Trademarks*